(12) United States Patent
Dinhthi et al.

(10) Patent No.: US 11,329,938 B2
(45) Date of Patent: May 10, 2022

(54) TERMINAL APPARATUS AND METHOD FOR CONTROLLING INTERNET OF THINGS (IOT) DEVICES

(71) Applicant: SAMSUNG ELECTRONICS CO., LTD., Suwon-si (KR)

(72) Inventors: Thuy Nga Dinhthi, Suwon-si (KR); Madan Kanth Lanka, Seoul (KR); Dwarka Prasad Dayama, Seoul (KR); Markus Jung, Seoul (KR); Ashok Babu Channa, Suwon-si (KR); Naga Ashok Babu Jampani, Suwon-si (KR); Ji-hun Ha, Seoul (KR); So-young Youn, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 311 days.

(21) Appl. No.: 16/088,178

(22) PCT Filed: Dec. 23, 2016

(86) PCT No.: PCT/KR2016/015143
§ 371 (c)(1),
(2) Date: Sep. 25, 2018

(87) PCT Pub. No.: WO2017/171204
PCT Pub. Date: Oct. 5, 2017

(65) Prior Publication Data
US 2020/0304445 A1 Sep. 24, 2020

(30) Foreign Application Priority Data
Mar. 31, 2016 (KR) .................. 10-2016-0039720

(51) Int. Cl.
*H04L 12/58* (2006.01)
*G06F 3/0481* (2013.01)
(Continued)

(52) U.S. Cl.
CPC .......... *H04L 51/18* (2013.01); *G06F 3/04817* (2013.01); *H04L 41/22* (2013.01); *G16Y 10/75* (2020.01); *G16Y 40/30* (2020.01)

(58) Field of Classification Search
CPC .. G06F 3/0481; G06F 3/04817; G06F 3/0488; G06F 3/16; G06F 3/048;
(Continued)

(56) References Cited

U.S. PATENT DOCUMENTS 9,092,971 B2    7/2015   Symoen et al.
9,876,652 B2 *   1/2018   Tatzel ....................... G06F 3/14
(Continued)

FOREIGN PATENT DOCUMENTS

KR    10-2004-0079449    9/2004
KR    10-2004-0094244    11/2004
(Continued)

OTHER PUBLICATIONS

International Search Report for PCT/KR2016/015143 dated Apr. 20, 2017, 4 pages.
(Continued)

*Primary Examiner* — Ninos Donabed
(74) *Attorney, Agent, or Firm* — Nixon & Vanderhye, P.C.

(57) ABSTRACT

An example terminal apparatus includes a communicator configured to communicate with at least one device through a hub device; a display configured to display an image; a user input receiver configured to receive a user's input; and at least one processor configured to control the display to display a dialog box where the hub device or the at least one device is set as a counterpart in response to execution of a messenger program, control the communicator to transmit a control signal including a command for controlling a predetermined device to the device targeted for control through
(Continued)

the hub device so that the device targeted for control operates in response to the command corresponding to a user's input, and control the display to display a message corresponding to the transmitted command in the dialog box.

17 Claims, 12 Drawing Sheets

(51) Int. Cl.
  *H04L 12/24* (2006.01)
  *G16Y 40/30* (2020.01)
  *G16Y 10/75* (2020.01)
  *H04L 51/18* (2022.01)
  *G06F 3/04817* (2022.01)
  *H04L 41/22* (2022.01)

(58) Field of Classification Search
  CPC ............... G08C 17/02; G08C 2201/42; G08C 2201/93; G16Y 10/75; G16Y 40/30; H04L 12/2818; H04L 12/2834; H04L 41/22; H04L 51/10; H04L 51/18; H04L 51/01; H04M 1/725
  See application file for complete search history.

(56) References Cited

U.S. PATENT DOCUMENTS

| | | | |
|---|---|---|---|
| 10,169,434 B1* | 1/2019 | Block | G06F 16/2228 |
| 10,394,802 B1* | 8/2019 | Porath | G06F 16/24578 |
| 10,534,791 B1* | 1/2020 | Block | G06F 16/248 |
| 2006/0142880 A1 | 6/2006 | Deen et al. | |
| 2006/0186986 A1 | 8/2006 | Ma et al. | |
| 2010/0013609 A1 | 1/2010 | Symoen et al. | |
| 2012/0096085 A1 | 4/2012 | Yoon et al. | |
| 2012/0109384 A1* | 5/2012 | Stepanian | H04L 12/2834 700/275 |
| 2013/0254315 A1 | 9/2013 | Solyanik et al. | |
| 2014/0156028 A1 | 6/2014 | Subramaniam et al. | |
| 2015/0067080 A1* | 3/2015 | Cho | H04L 67/025 709/206 |
| 2015/0230167 A1* | 8/2015 | Choi | H04W 12/06 455/411 |
| 2015/0341184 A1* | 11/2015 | Tatzel | H04L 12/28 700/275 |
| 2016/0098091 A1* | 4/2016 | Hwang | G06F 3/017 715/761 |
| 2016/0105292 A1* | 4/2016 | Choi | H04L 51/02 709/206 |
| 2016/0162654 A1* | 6/2016 | Gokhale | G16H 70/20 436/65 |
| 2016/0224208 A1* | 8/2016 | Bugajski | G06F 3/04817 |
| 2017/0024589 A1* | 1/2017 | Schumacher | G06F 3/0481 |
| 2017/0083585 A1* | 3/2017 | Chen | G06F 11/3006 |
| 2017/0085446 A1* | 3/2017 | Zhong | H04L 41/22 |
| 2017/0085447 A1* | 3/2017 | Chen | H04L 43/024 |
| 2017/0093645 A1* | 3/2017 | Zhong | H04L 67/10 |
| 2017/0187807 A1* | 6/2017 | Clernon | H04L 41/0806 |
| 2017/0255270 A1* | 9/2017 | Chao | G06F 1/1698 |
| 2018/0001483 A1* | 1/2018 | Song | B25J 13/006 |

FOREIGN PATENT DOCUMENTS

| | | |
|---|---|---|
| KR | 10-2007-0075142 | 7/2007 |
| KR | 10-2015-0028008 | 3/2015 |

OTHER PUBLICATIONS

Extended Search Report dated Feb. 12, 2019 in counterpart EP Application No. 16897224.8.
Communication pursuant to Article 94(3) EPC dated Jul. 3, 2020 in counterpart European Patent Application No. 16897224.8.
Summons to attend oral proceedings pursuant to Rule 115(1)EPC mailed Sep. 30, 2021 in counterpart European Patent Application No. 16897224.8.

* cited by examiner

FIG. 8
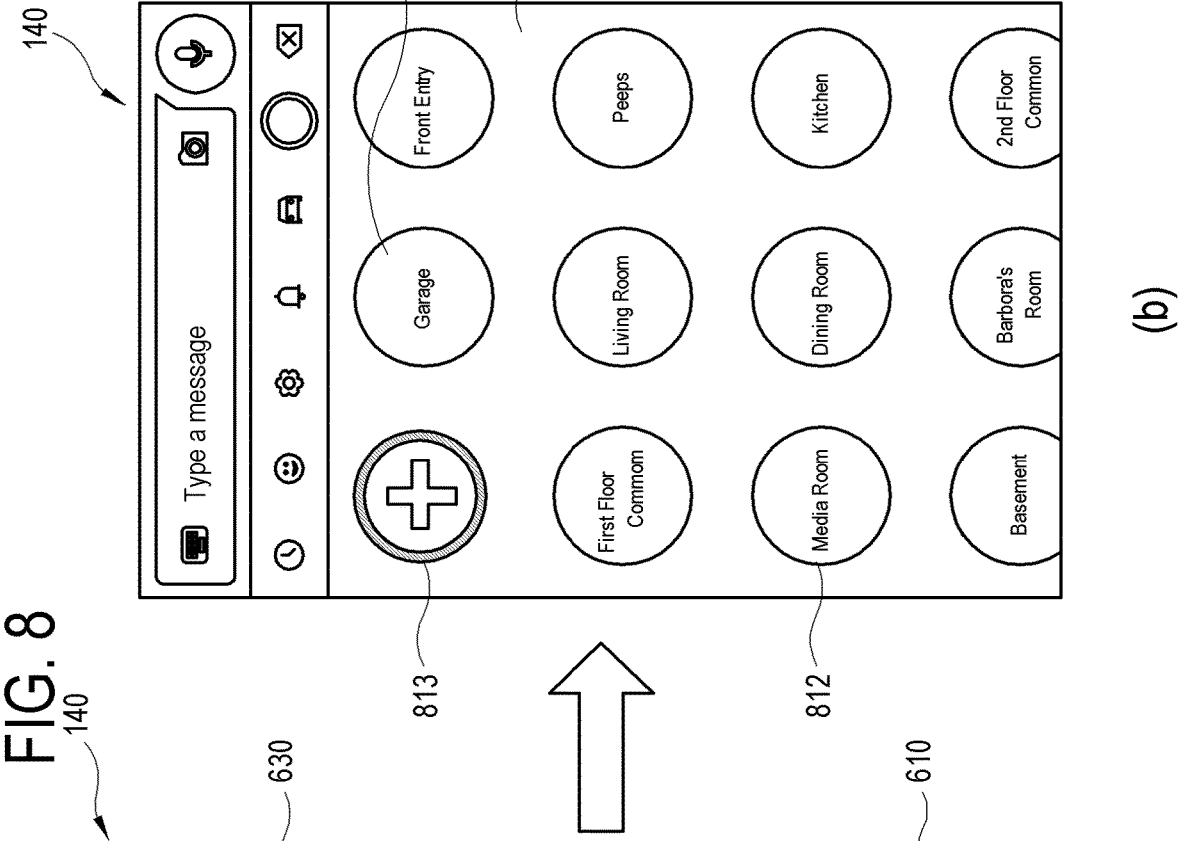
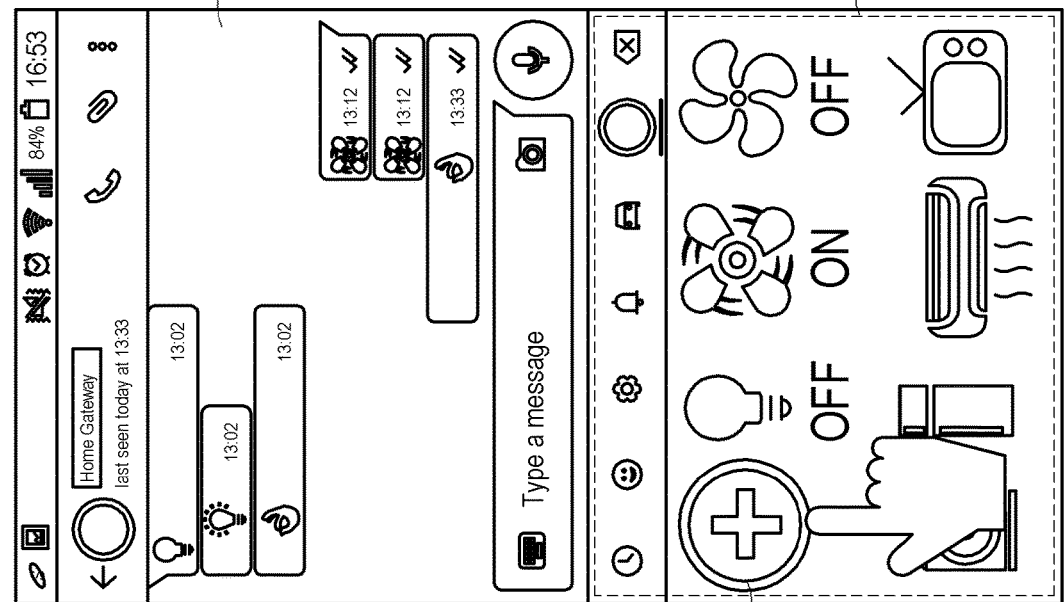

TERMINAL APPARATUS AND METHOD FOR CONTROLLING INTERNET OF THINGS (IOT) DEVICES

This application is the U.S. national phase of International Application No. PCT/KR2016/015143 filed Dec. 23, 2016 which designated the U.S. and claims priority to KR Patent Application No. 10-2016-0039720 filed Mar. 31, 2016, the entire contents of each of which are hereby incorporated by reference.

TECHNICAL FIELD

The present invention relates to a terminal apparatus and a controlling method thereof, and more particularly to a terminal apparatus and a controlling method thereof, which controls an operation of a device in response to a command corresponding to a user's input to the terminal apparatus.

BACKGROUND ART

With development of electronic technology, various types of electronic products have been developed and spread. For example, various terminal apparatuses such as a smart phone, a smart pad (tablet), a personal digital assistant (PDA), etc. has been widely used. There are no limits to the functions of the terminal apparatus, and the functions may be changed and/or extended.

Internet of things (IoT) refers to technology and service where various things, i.e. devices such as home appliances and electronic devices are connected via a network to share information.

Accordingly, IoT-based services of controlling operations of devices in home are in demand, and there is a need of a means for helping a user in more easily controlling the devices.

SUMMARY

A terminal apparatus according to one embodiment of the present invention includes a communicator configured to communicate with at least one device through a hub device; a display configured to display an image; a user input receiver configured to receive a user's input; and at least one processor configured to control the display to display a dialog box where the hub device or the at least one device is set as a counterpart in response to execution of a messenger program, control the communicator to transmit a control signal including a command for controlling a predetermined device to the device targeted for control through the hub device so that the device targeted for control operates in response to the command corresponding to a user's input when the user's input corresponding to the command is received in the displayed dialog box through the user input receiver, and control the display to display a message corresponding to the transmitted command in the dialog box. Thus, the messenger program is used to control an operation of a household device in home, which operates as an IoT device, and it is possible to provide convenience to a user.

The dialog box may display a plurality of selectable icons corresponding to commands for controlling the at least one device, and the processor may transmit a control signal including a command corresponding to a selected icon in response to a user's input for selecting at least one among the plurality of icons. Thus, it is easy to visually identify the kinds of command, and therefore a user can control the device with a simple input for selecting an icon without making a complicated input for the command.

The plurality of icons may be displayed in response to selection of an Internet of things (IoT) tab provided in an input area of the dialog box, and the IoT tab is included in a keypad displayed for a user's input in the input area. Thus, the keypad including the icon corresponding to the command is provided in itself even though a user does not separately install a separate program.

The IoT tab may be activated in response to a user's input for registering the hub device or the at least one device as the counterpart. Thus, user convenience is improved since the IoT service is automatically provided when the device is registered as the counterpart.

The processor may automatically register the hub device or the at least one device as the counterpart in the messenger program, or control the display to display the hub device or the at least one device in a counterpart recommendation list. Thus, a user is free from a wasteful process of retrieving the counterpart.

At least one among the plurality of icons may correspond to a predetermined device targeted for control, and the user input receiver may receive a first input of a user for selecting one among the plurality of icons, and a second input of a user corresponding to a command for controlling a device corresponding to the selected icon. Thus, the kind of commands to be issued is not limited to the icon, and it is possible to receive various inputs of a user.

The second input of a user may include at least one of a text, a drawing, and a voice uttered by a user. Thus, a user can issue a command without restriction through his/her own convenient user input manner.

The user input receiver may further receive a third input of a user for generating a group including a plurality of devices, and the processor may control the communicator to transmit a control signal including a command to the plurality of devices through the hub device so that the plurality of devices included in the group operates in response to the command input by a user. Thus, it is possible to transmit a command to a plurality of devices at a time without individually and repetitively making the command inputs corresponding to the devices.

The control signal including the command may be transmitted to the hub device via a communication network or mobile communication network of a service provider of the messenger program. Thus, a user can easily issue a command at an outside beyond a range of a local area network provided by a home network.

Meanwhile, a terminal apparatus according to another embodiment of the present invention includes a communicator configured to communicate with an outside; a user input receiver configured to receive a user's input; and at least one processor configured to control the communicator to transmit and receive a message to and fro another terminal apparatus of a messenger counterpart in response to a user's input using a first user interface displayed by executing a messenger program, control the display to display a second user interface where a hub device or at least one device is set as a counterpart in response to execution of the messenger program by a user's input, and control the communicator to transmit a command to a device targeted for control through the hub device in response to a user's input using the second user interface. Thus, the messenger program is used to control an operation of a household device in home, which operates as an IoT device, and it is possible to provide convenience to a user.

The second user interface may include a dialog box displaying a plurality of selectable icons corresponding to commands for controlling the at least one device, and the processor may transmit a command corresponding to a selected icon in response to a user's input for selecting at least one among the plurality of icons. Thus, it is easy to visually identify the kinds of command, and therefore a user can control the device with a simple input for selecting an icon without making a complicated input for the command.

At least one among the plurality of icons may correspond to a predetermined device targeted for control, and the user input receiver may receive a first input of a user for selecting one among the plurality of icons, and a second input of a user corresponding to a command for controlling a device corresponding to the selected icon. Thus, the kind of commands to be issued is not limited to the icon, and it is possible to receive various inputs of a user.

Meanwhile, a controlling method of a terminal apparatus according to one embodiment of the present invention includes displaying a dialog box where a hub device or at least one device is set as a counterpart in response to execution of a messenger program; receiving a user's input corresponding to a command for controlling a predetermined device in the displayed dialog box; transmitting a control signal including the command to a device targeted for control through the hub device so that the device targeted for control operates in response to the command corresponding to the user's input; and displaying a message corresponding to the transmitted command in the dialog box. Thus, the messenger program is used to control an operation of a household device in home, which operates as an IoT device, and it is possible to provide convenience to a user.

The dialog box may display a plurality of selectable icons corresponding to commands for controlling the at least one device, and the receiving of the user's input may include receiving a user's input for selecting one among the plurality of icons, and the transmitting of the control signal may include transmitting a control signal including a command corresponding to the selected icon. Thus, it is easy to visually identify the kinds of command, and therefore a user can control the device with a simple input for selecting an icon without making a complicated input for the command.

The method may further include displaying the plurality of icons in response to selection of an IoT tab provided in an input area of the dialog box. Thus, the keypad including the icon corresponding to the command is provided in itself even though a user does not separately install a separate program.

The method may further include activating the IoT tab in response to a user's input for registering the hub device or the at least one device as the counterpart. Thus, user convenience is improved since the IoT service is automatically provided when the device is registered as the counterpart.

The method may further include automatically registering the hub device or the at least one device as the counterpart in the messenger program, or displaying the hub device or the at least one device in a counterpart recommendation list. Thus, a user is free from a wasteful process of retrieving the counterpart.

At least one among the plurality of icons may correspond to a predetermined device targeted for control, and the receiving of the user's input may include: receiving a first input of a user for selecting at least one among the plurality of icons; and receiving a second input of a user corresponding to a command for controlling a device corresponding to the selected icon. Thus, the kind of commands to be issued is not limited to the icon, and it is possible to receive various inputs of a user.

The second input of a user may include at least one of a text, a drawing, and a voice uttered by a user. Thus, a user can issue a command without restriction through his/her own convenient user input manner.

The method may further include receiving a third input of a user for generating a group including a plurality of devices, wherein the transmitting of the control signal includes transmitting a control signal including a command to the plurality of devices through the hub device so that the plurality of devices included in the group operates in response to the command input by a user. Thus, it is possible to transmit a command to a plurality of devices at a time without individually and repetitively making the command inputs corresponding to the devices.

According to one embodiment of the present invention, a program of providing a messenger service is used to issue a command for controlling an operation of a device operating as an IoT device in home, and it is more convenient for a user to use an IoT service.

Further, the dialog box provides icons that make it easy to visually identify the kinds of command, so that a user can readily issue a desired command without making a complicated input for the command.

Besides, various user input manners such as a text, a drawing, a voice, etc. are supported, and thus a user can issue a command without restriction through his/her own convenient user input manner.

Further, a hub device or a device targeted for control is registered as a counterpart, and the IoT service is available by a simple method of inputting a message to the registered counterpart, thereby more easily extending the service.

Further, a command input is made in units of a group in the dialog box, and it is thus possible to transmit a command to a plurality of devices at a time without individually and repetitively making the command inputs corresponding to the devices.

BRIEF DESCRIPTION OF THE DRAWINGS

FIGS. 6, 7, 8, 9 and 10 are views for explaining a process of inputting a command for controlling a device through a dialog box in a terminal apparatus according to one embodiment of the present invention.

DETAILED DESCRIPTION OF EXAMPLE EMBODIMENTS

Below, exemplary embodiments will be described with reference to accompanying drawings to such an extent as to be easily realized by a person having an ordinary knowledge in the art. The present inventive concept is not limited to the embodiments set forth herein, and may be materialized variously.

Terms to be used in the following descriptions will be selected as general terms currently used as widely as possible taking functions of elements into account, but may be varied depending on intent of those skilled in the art, precedents, the advent of new technology, etc. In particular, there may be a term voluntarily selected by the applicant. In this case, the meaning of the term will be explained in detail through the relevant detailed descriptions. Therefore, the terms set forth herein have to be read in light of its meaning and content throughout the following descriptions rather than naming.

In the following descriptions, terms such as "include" or "have" refer to presence of features, numbers, steps, operations, elements or combination thereof, and do not exclude presence or addition of one or more other features, numbers, steps, operations, elements or combination thereof.

A "portion" set forth herein refers to software or hardware such as a field-programmable gate array (FPGA) or an application-specific integrated circuit (ASIC), and performs certain roles. However, the meaning of the "portion" is not limited to software or hardware. The "portion" may be configured to be present in a storage medium for addressing or may be configured to reproduce one or more processors. For example, the "portion" includes software elements, object-oriented software elements, class elements, task elements and the like elements, and processes, functions, attributes, procedures, subroutines, segments of a program code, drivers, firmware, a microcode, a circuit, data, a database, data structures, tables, arrays and variables. The function provided in the elements and the "portions" may be carried out by combining fewer elements and "portions" or may be subdivided by additional elements and "portions".

For clarity of the present invention in association with the drawings, portions not directly related to the elements of the present invention may be omitted, and like numerals refer to like elements throughout.

Figure 1:
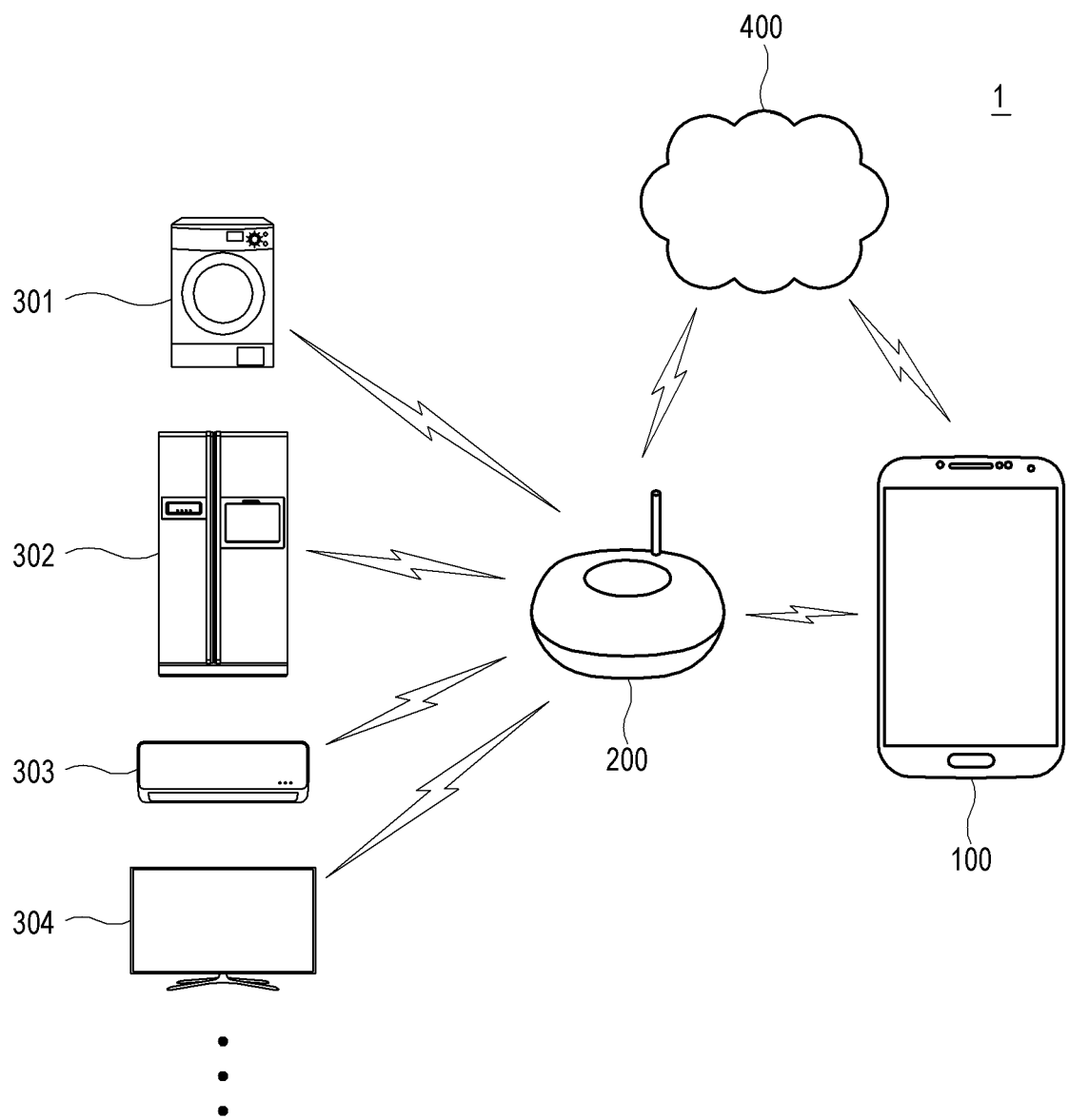
FIG. 1 illustrates an example of a home network system according to one embodiment of the present invention.

FIG. 1 illustrates an example of a home network system 1 according to one embodiment of the present invention, As shown in FIG. 1, a home network system (or a home automation system) 1 according to one embodiment of the present invention includes a terminal apparatus 100, a hub device 200 and at least one device 301, 302, 303 and 304 targeted for control.

According to one embodiment, the home network system 1 may further include a server 400 that provides data related to a messenger service.

The terminal apparatus 100 communicates with at least one device 301, 302, 303 and 304 through the hub device 200. Specifically, the terminal apparatus 100 transmits a control signal for controlling operations of at least one device 301, 302, 303 and 304 to the hub device 200, and the control signal is transmitted to the device targeted for control through the hub device 200.

According to one embodiment of the present invention, the terminal apparatus 100 may be materialized by various mobile digital apparatuses such as a smart phone shown in FIG. 1, a tablet computer or the like smart pad, a personal digital assistant (PDA), etc.

According to one embodiment, the terminal apparatus 100 may be a smart watch, a smart band or the like wearable apparatus (hereinafter, referred to as a digital accessories, smart accessories, or Appcessory) which can be worn on a user's body part.

The terminal apparatus 100 according to the present invention is not limited to a mobile portable apparatus. According to one embodiment, the terminal apparatus 100 may be materialized by a laptop or desktop computer, or a smart TV.

The terminal apparatus 100 according to one embodiment of the present invention is provided with at least one program for providing a messenger service, i.e. a messenger application or a chat application. The messenger program includes various programs that are used by many users, for example, Kakao Talk, Line, Google Talk, Skype, WhatsApp, etc.

A user uses the messenger program installed in the terminal apparatus 100 to have a talk with, i.e. communicate with the other party (or another user) such as a family member, a friend, a colleague, etc., i.e. a user of another terminal apparatus by sending and receiving a message (a message exchange). Here, a user may add the other party as a counterpart of a messenger program, based on account information for identifying another user, for example, a phone number, an E-mail address, user identification (ID) used in a predetermined community, etc.

According to one embodiment of the present invention set forth herein, a user makes an input for transmitting a control signal including a command for controlling an operation of a predetermined device (i.e. at least one of 301, 302, 303 and 304) to a hub device 200 through the installed messenger program, and the transmitted control signal is sent to the device (i.e. at least one of 301, 302, 303 and 304) through the hub device 200.

A dialog box or a dialog window displayed for communication with a user of another terminal apparatus in a state that the messenger program is running in the terminal apparatus 100 according to one embodiment of the present invention will be defined as a first user interface (UI), and a dialog box displayed for inputting a command for controlling a predetermined device 301, 302, 303 or 304 through the hub device 200 will be defined as second UI.

According to one embodiment, the messenger program may be distributed by a messenger service provider such as a manufacturer of the terminal apparatus 100, a telecommunication company, and a portal site, as it is embedded during a manufacturing stage of the terminal apparatus 100, or downloaded from the App store or the like market server to the terminal apparatus 100 and installed.

According to alternative embodiment, the messenger program may include a program installed in the terminal apparatus 100 during the manufacturing stage and providing a short message service (SMS).

A plurality of messenger programs may be installed in the terminal apparatus 100 according to one embodiment of the present invention.

The hub device 200 is provided to relay communication between the terminal apparatus 100 and the devices 301, 302, 303 and 304 targeted for control. According to one embodiment, the hub device 200 has an access to a home network and a public communication network, and includes aggregated network equipment serving as a gateway, a router or a sharer, to which an address is assigned. Further, the hub device 200 includes its own processor and memory, and is provided to enable protocol conversion or bandwidth conversion.

The hub device 200 receives a control signal including a command for controlling at least one device 301, 302, 303 and 304 from the terminal apparatus 100, and transmits the received control signal to the device targeted for control.

According to one embodiment, the hub device 200 may download data (e.g. an icon corresponding to the command) for controlling the operations of the devices 301, 302, 303 and 304 from the server 400 provided for a messenger service and provide the data to the terminal apparatus 100.

At least one device 301, 302, 303 or 304 performs a controlling operation corresponding to the command included in the control signal received through the hub device 200.

The devices 301, 302, 303 and 304 include various electronic devices connectable by the home network system 1, for example, a washing machine, a refrigerator, an air conditioner, a TV, and the like home appliances. Further, the devices 301, 302, 303 and 304 may include various kinds of electronic devices provided as things or smart things, which operate based on IoT technology, such as health care, remote metering, a smart home, a smart car, etc. The devices 301, 302, 303 and 304 may include sensors for sensing surrounding environments to perform their own operations.

The server 400 may operate by a service provider that provides the messenger program, and include a cloud server. According to one embodiment, the server 400 may provide information about the devices 301, 302, 303 and 304 controllable by the terminal apparatus 100, and information about commands for controlling the device 301, 302, 303 and 304 to the terminal apparatus 100 through the hub device 200.

Below, a configuration of the terminal apparatus 100 will be described with reference to FIG. 2.

Figure 2:
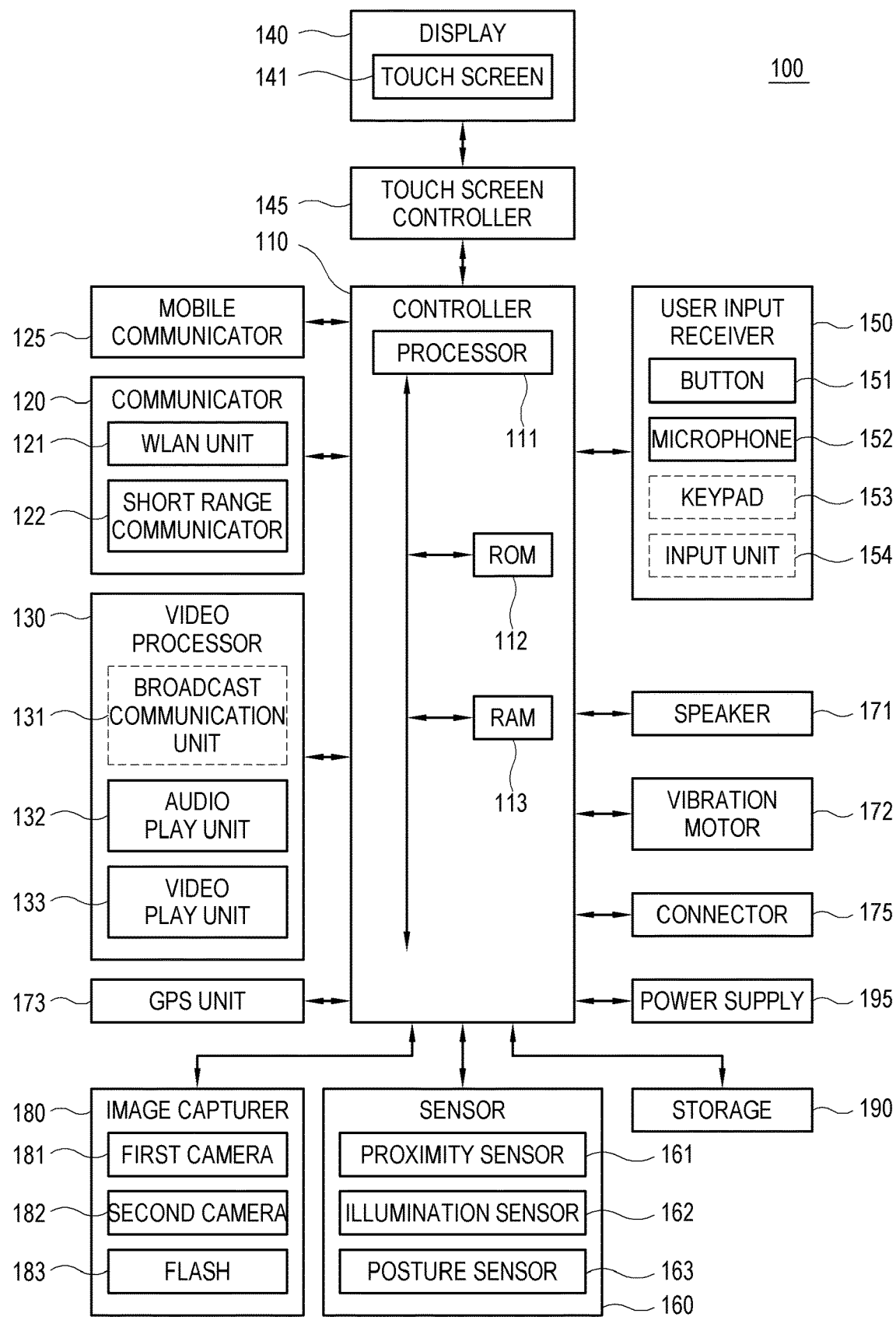
FIG. 2 is a block diagram of a terminal apparatus according to one embodiment of the present invention.

FIG. 2 is a block diagram of a terminal apparatus 100 according to one embodiment of the present invention.

In this embodiment, the terminal apparatus 100 wirelessly connects with other devices including the hub device 200 through a communicator 130 (to be described later), and transmits/receives a control signal. According to one embodiment, the terminal apparatus 100 is defined as an apparatus having a touch screen 141 and transmitting/receiving data through the communicator 130.

In the terminal apparatus 100 according to one embodiment, a user input receiver 150 may be defined to include a physical button 151, a keypad displayed on the touch screen 141, and a separate input device (e.g. a pointing device) in which a user's touch input can be made. The user input receiver 150 may receive a touch made by a user's body part (e.g. a finger) onto the touch screen 141. The user input receiver 150 transmits various preset control commands or information to the controller 110 in response to a user's input including a touch input.

As shown in FIG. 2, the terminal apparatus 100 includes a display 140 including the touch screen 141, and a touch screen controller 145. The terminal apparatus 100 includes the controller 110, the communicator 120, an image processor 130, the display 140, the user input receiver 150, a sensor 160, an image capturer 180, a storage 190, and a power supply 195.

The communicator 120 includes at least one of a wireless local area network (WLAN) unit 121 and a short range communicator 122, and the image processor 130 includes at least one of a broadcast communication unit 131, an audio play unit 132, and a video play unit 133. The user input receiver 150 includes at least one of a button 151, a microphone 152, a keypad 153, and an input device 154. The sensor 160 includes at least one of a proximity sensor 161, an illumination sensor 162, and a posture sensor 163. The image capturer 180 includes at least one of a first camera 181 and the second camera 182.

Further, the terminal apparatus 100 according to one embodiment of the present invention may further include at least one of a mobile communicator 125, a loudspeaker 171, a vibration motor 172, a GPS unit 173, and a connector 175.

The controller 110 may include at least one processor 111, a read only memory (ROM) 112 in which a control program for controlling the terminal apparatus 100 is stored, and a random access memory (RAM) 113 in which a signal or data received from the outside of the terminal apparatus 100 is stored or various jobs implemented in the terminal apparatus 100 are stored.

The controller 110 controls general operations of the terminal apparatus 100 and signal flow between the internal elements 120 to 195 of the terminal apparatus 100, and implements a function of processing data. The controller 110 controls the power supply 195 to supply electric power to the internal elements 120 to 190. Further, when a user makes an input or when a previously set and stored condition is satisfied, the controller 110 may execute an operating system (OS) and various programs/applications/software stored in the storage 190.

The processor 111 includes at least one general-purpose processor such as a central processing unit (CPU), an application processor (AP), and a microcomputer (MICOM), and loads and executes a program corresponding to a predetermined algorithm from the ROM 112 to the RAM 113, thereby implementing various operations of the terminal apparatus 100.

The processor 111 may include a single core, a dual core, a triple core, a quad core, or other multiple cores. The processor may include a plurality of processors, for example, a main processor and a sub processor. The sub processor is provided to operate in a standby mode (or a sleep mode) where the terminal apparatus 100 receives only standby power and remains idle.

The processor 111, the ROM 112, and the RAM 113 may connect with one another through an internal bus.

According to one embodiment, the processor 111 may include a graphic processing unit (GPU, not shown) for processing graphics. For example, when the terminal apparatus 100 is a smart phone, a smart pad or a smart TV, the processor 111 may be materialized in the form of a system on chip (SoC) where a core (not shown) ad a GPU (not shown) are combined.

According to another embodiment, when the terminal apparatus 100 is a computer, the controller 110 may further include a separate GPU for processing graphics.

Meanwhile, according to still another embodiment of the present invention, the controller 110 may further include a program for implementing a specific function supported in the terminal apparatus 100, for example, a function for detecting an error in certain elements including the main processor, and a chip provided as a processor dedicated for executing the program, for example, an integrated circuit (IC) chip.

The controller 110 may control the communicator 120, the mobile communicator 125, the image processor 130, the display 140 including the touch screen 141, the touch screen controller 145, the user input receiver 150, the sensor 160, the loudspeaker 171, the vibration motor 172, the GPS unit 173, the image capturer 180, the storage 190, and the power supply 195.

The terminal apparatus 100 according to one embodiment of the present invention may include only the WLAN unit 121 or both the WLAN unit 121 and the short range communicator 122 as the communicator 120.

Under control of the controller 110, the WLAN unit 121 may have a wireless access to an access point (AP) at a place where the AP is provided. The WLAN unit 121 supports WLAN standards (IEEE802.11x) of Institute of Electrical and Electronics Engineers (IEEE).

According to one embodiment, the AP may be provided in the hub device 200. The terminal apparatus 100 may have an access to a home network, which includes the hub device 200 and at least one device 301, 302, 303 and 304, by the WLAN unit 121.

The short range communicator 122 may be provided to support near field communication (NFC) with other devices wirelessly without the AP under control of the controller 110.

The short range communicator 122 may include at least one of modules for Bluetooth, Bluetooth low energy, infrared data association (IrDA), Wi-Fi, Wi-Fi Direct, ZigBee, Ultra-Wideband (UWB), near field communication (NFC), etc.

The mobile communicator 125 may connect with an external device, i.e. other devices through mobile communication by one or at least two antennas (not shown) under control of the controller 110. The mobile communicator 125 transmits/receives a wireless signal for data communication, a multimedia message (MMS), a short message service (SMS), a video call and a voice call with a cellular phone, a smart phone, a tablet computer, or other terminal apparatuses (or mobile apparatuses) having a phone number to which the terminal apparatus 100 can have an access. The wireless signal transmitted through the mobile communicator 125 is delivered to the other part through a mobile communication network such as long term evolution (LTE), 3G and 4G.

The terminal apparatus 100 may include combination of two or more among the mobile communicator 125, the WLAN unit 121, and the short range communicator 122 in accordance with performance.

According to one embodiment of the present invention, the communicator 120 is provided to communicate with the devices 301, 302, 303 and 304 through the hub device 200 under control of the controller 110, and such communication includes transmission and reception of the command for controlling the devices 301, 302, 303 and 304.

In this embodiment, the term "communicator" basically denotes the communicator 120, but may be defined to include both the communicator 120 and the mobile communicator 125 as necessary.

The image processor 130 may include the broadcast communication unit 131, the audio play unit 132 or the video play unit 133. The broadcast communication unit 131 may receive a broadcast signal (e.g. a TV broadcast signal, a radio broadcast signal, or a data broadcast signal) and broadcast appended information (e.g. an electric program guide (EPG), or an electric service guide (ESG)) from an external broadcasting station through a broadcasting communication antenna (not shown) under control of the controller 110. Further, the controller 110 may process the received broadcast signal and broadcast appended information to be played in the display 140 and/or the loudspeaker 171 through a video codec unit and/or an audio codec unit.

The audio play unit 132 may process an audio source (e.g. an audio file with an extension of 'mp3', 'wma', 'ogg' or 'wav'), previously stored in the storage 190 of the terminal apparatus 100 or received from the outside, to be reproduced by the loudspeaker 171 under control of the controller 110.

According to one embodiment of the present invention, the audio play unit 132 may reproduce an auditory feedback (e.g. an output of an audio source stored in the storage 190), which corresponds to a touch or consecutive touch motions detected on the touch screen 141, through an audio codec unit under control of the controller 110.

The video play unit 133 may process a digital video source (e.g. a file with an extension of 'mpeg', 'mpg', 'mp4', 'avi', 'mov' or 'mkv'), previously stored in the storage 190 of the terminal apparatus 100 or received from the outside, to be reproduced by a video codec unit under control of the controller 110. Most of applications installable in the terminal apparatus 100 are capable of reproducing the audio source and/or video file through the audio codec unit and/or video codec unit.

According to one embodiment of the present invention, the video play unit 133 may reproduce a visual feedback (e.g. an output of a video source stored in the storage 190), which corresponds to a touch or consecutive touch motions detected on the touch screen 141, through a video codec unit under control of the controller 110.

In addition, it will be easily understood by a person having an ordinary skill in the art that many kinds of video and audio codec units have been produced and sold.

According to one embodiment, the image processor 130 may the audio play unit 132 and the video play unit 133 except the broadcast communication unit 131 in accordance with the performance or structure of the terminal apparatus 100. Further, the audio play unit 132 and/or the video play unit 133 of the image processor 130 may be included in the controller 110. According to one embodiment of the present invention, the term "video codec unit" may denote one or at least two video codec units. Further, according to one embodiment of the present invention, the term "audio codec unit" may denote one or at least two audio codec units.

The display 140 displays an image based on an image signal processed by the image processor 130. There are no limits to the materialization of the display 140, and the display 140 may be materialized by various types such as liquid crystal, plasma, a light-emitting diode, an organic light-emitting diode, a surface-conduction electron-emitter, a carbon nano-tube, nano-crystal, etc.

The display 140 may include an additional element in accordance with the types thereof. For example, when the display 140 is a liquid crystal type, the display 140 includes a liquid crystal display (LCD) panel (not shown), a backlight unit (not shown) for emitting light to the LCD panel, and a panel driving substrate (not shown) for driving the LCD panel (not shown).

According to one embodiment, the display 140 may include the touch screen 141 to receive an input based on a user's touch. The touch screen 141 may be for example achieved by a resistive type, a capacitive type, an infrared type, or an acoustic wave type.

The touch screen 141 may display an object (e.g. a menu, a text, an image, a moving image, a figure, an icon and a shortcut icon) including a menu item of the display apparatus 100 as the user interface UI. A user may touch an object displayed on the touch screen 141 with his/her body part (e.g. a finger), a stylus, a pointing device, and the like separate input unit 154, thereby making the user's input.

The touch screen 141 may provide a graphic user interface (GUI) corresponding to various services (e.g. a phone call, data transmission, broadcasting, image capturing, a moving image or an application) to a user. The touch screen 141 transmits an analog signal corresponding to a single touch or multi-touches received through the GUI to the controller 110.

According to one embodiment, the touch may be not limited to a contact touch between the touch screen 141 and a user's body part or a touch pointing device, but may include a contactless touch (e.g. hovering of which a touch detectable distance is shorter than or equal to 30 mm between the touch screen 141 and a user's body part or between the touch screen 121 and the pointing device. It will be appreciated by a person having an ordinary skill in the art that the contactless touch-detectable distance of the touch screen 141 is varied depending on the performance or structure of the terminal apparatus 100. In this embodiment, a touch input includes dragging, flicking, dragging & dropping, tabbing, long tabbing, etc.

According to one embodiment, the display 140 may display a dialog box to receive an input of a command for controlling operations of at least one device 301, 302, 303 and 304 in response to execution of a program of providing the messenger service.

The user input receiver 150 may include at least one among one or at least two buttons 151, a microphone 152, a keypad 153, and an input unit 154.

The button 151 includes at least one among a menu button, a home button, and a back button provided in a front lower portion. The button 151 may include power/lock and/or volume buttons. Here, the button 151 of the terminal apparatus 100 may be achieved by a touch button provided on the touch screen 141 as well as a physical button. Further, the button 151 of the terminal apparatus 100 may be displayed as a text or an icon within the touch screen 141.

According to one embodiment, the user input receiver 150 of the terminal apparatus 100 may receive a user's input based on interaction with content displayed on the touch screen 141, i.e. a touch or a touch gesture.

The microphone 152 receives a voice or sound from the outside and generates an electric signal under control of the controller 110. The electric signal generated in the microphone 152 may be converted by the audio codec unit and stored in the storage 190, or may be output through the loudspeaker 171. One or at least two microphones 152 may be placed at front, lateral and rear sides of the terminal apparatus 100.

The keypad 153 may receive a key input from a user to control the terminal apparatus 100. The keypad 153 may include at least one among a physical keypad (not shown) formed on the front of the terminal apparatus 100, a virtual keypad (see '610' in FIG. 6) displayed on the display 140 including the touch screen 141, and an external keypad (e.g. a keyboard dock, not shown) connected by a wire or wirelessly. When the keypad 153 is the external keypad, a user's key input signal may be received through the communicator 120 or the connector 175.

According to one embodiment, the virtual keypad may be displayed in an input area of the dialog box displayed on the display 140, and include the plurality of icons corresponding to commands for controlling operations of the device 301, 302, 303 and 304. A user may make the command corresponding to a selected icon be transmitted to the device targeted for control in response to a user's input for selecting at least one among the plurality of icons.

It will be easily understood by a person having an ordinary skill in the art that the physical keypad provided on a front side of terminal apparatus 100 may be excluded in accordance with the performance or structure of the terminal apparatus 100.

The input unit 154 may be used in touching or selecting an object (e.g. a menu, a text, an image, a moving image, a figure, an icon and a shortcut icon) displayed on a screen displayed on the touch screen 141 in the terminal apparatus 100.

According to one embodiment, the object may correspond to content. The content includes an application installed in the terminal apparatus 100, image data captured through cameras 161 and 162, media data stored in the storage 190, text data of a document, a contact, etc., and the like various pieces of data to be transmitted and received to and from other devices.

The input unit 154 is used in touching a capacitive, resistive, or electromagnetic induction-type touch screen, or inputting a text, an icon, etc. using a virtual keypad. The input unit 154 may for example include a pointing device, a stylus, a haptic pen in which a built-in pen vibration device (e.g. a vibration motor or an actuator) is vibrated using control information received from the communicator 120 of the terminal apparatus 100, etc. Further, the vibration device may vibrate using not the control information received from the terminal apparatus 100 but sensing information from a built-in sensor (e.g. an accelerometer, not shown) of the input unit 154. The input unit 154 may be inserted in an insertion hole of the terminal apparatus 100, but it will be understood by a person having an ordinary skill in the art that the input unit 154 may be excluded in accordance with the performance or structure of the terminal apparatus 100.

The sensor 160 includes at least one sensor for detecting the states of the terminal apparatus 100. For example, the sensor 160 includes at least one among the proximity sensor 161 placed in a front top portion of the terminal apparatus 100 of a user and detecting proximity to the terminal apparatus 100, the illumination sensor 162 for detecting the amount of light around the terminal apparatus 100, the posture sensor 163 for detecting the posture and orientation of the terminal apparatus 100, a gravity sensor for detecting a gravitational direction, and an altimeter for measuring atmospheric pressure and detecting an altitude. The posture sensor 163 may include a gyroscopic sensor using rotational inertia, an accelerometer for detecting three-axial gradients (e.g. of x-axis, y-axis, and z-axis) of the terminal apparatus 100, etc.

The sensor 160 is capable of sensing acceleration where movement acceleration and gravitational acceleration of the terminal apparatus 100 are summed up, and sensing only the gravitational acceleration when the terminal apparatus 100 does not move. For example, when the front side of the terminal apparatus 100 faces upward, the gravitational acceleration is in a positive (+) direction. When the rear side of the terminal apparatus 100 faces upward, the gravitational acceleration is in a negative (−) direction.

At least one sensor included in the sensor 160 detects the state of the terminal apparatus 100, and generates a signal corresponding to the detection and transmits the signal to the controller 110. It will be easily understood by a person having an ordinary skill in the art that the sensors of the sensor 160 may be added or deleted in accordance with the performance of the terminal apparatus 100.

The loudspeaker 171 may output sound corresponding to various signals (e.g. a wireless signal, a broadcast signal, an audio source, a moving image file, and image capturing) of the communicator 120, the mobile communicator 125, the image processor 130 and the image capturer 180 to the outside through the audio codec unit under control of the controller 110.

The loudspeaker 171 may output sounds (e.g. a touch control sound corresponding to phone number inputs, an image capturing button control sound, etc.) corresponding to functions to be implemented by the terminal apparatus 100. At least one loudspeaker 171 may be provided in the front, lateral and rear sides of the terminal apparatus 100.

According to one embodiment of the present invention, the loudspeaker 171 may output an auditory feedback corresponding to a touch or consecutive touch motions detected in the touch screen 141 under control of the controller 110.

The vibration motor 172 converts an electric signal into mechanical vibration under control of the controller 110. For example, the vibration motor 172 may include a linear vibration motor, a bar-type vibration motor, a coin-type vibration motor, or a piezoelectric vibration motor. When a voice call request is received from another terminal apparatus, the vibration motor 172 operates under control of the controller 110 when the terminal apparatus 100 is in a vibration mode. The terminal apparatus 100 may include one or at least two vibration motors 172. Further, the vibration motor 172 may vibrate the whole of the terminal apparatus 100 or only a part of the terminal apparatus 100.

The GPS unit 173 periodically receives information (e.g. correct location information and time information of a GPS satellite (not shown) receivable in the terminal apparatus 100) from a plurality of GPS satellites (not shown) on an orbit of the earth. The terminal apparatus 100 determines its own location, velocity and/or time based on the information received from the plurality of GPS satellites.

The connector 175 may be used as an interface for connection between the terminal apparatus 100 and an external device (not shown) or a power source (not shown). Under control of the controller 110, the terminal apparatus 100 may transmit data stored in the storage to an external device or receive data from an external device through a cable connected to the connector 175. The terminal apparatus 100 may receive power from a power source or charge a battery provided as the power supply 195 through the wire connected to the connector 175. Further, the terminal apparatus 100 may connect with external accessories (e.g. a photo printer, not shown) through the connector 175.

The image capturer 180 may include at least one of a front first camera 181 and a rear second camera 182 to capture a still image or a moving image under control of the controller 110. The image capturer 180 may include one or all of the first camera 181 and the second camera 182. Further, the image capturer 180 may further include an auxiliary light source (e.g. a flash) 183 to provide light necessary for the image capturing of the first camera 181 or the second camera 182.

The storage 190 may be configured to a signal or data input/output corresponding to the operations of the communicator 120, the mobile communicator 125, the image processor 130, the display 140, the user input receiver 150, the sensor 160, the loudspeaker 171, the vibration motor 172, the GPS unit 173, the connector 175, and/or the image capturer 180 under control of the controller 110. The storage 190 may be configured to store a control program for controlling the terminal apparatus 100, a graphic user interface (GUI) related to an application provided by a manufacturer or downloaded from the outside, images for providing the GUI, user information, documents, databases, or related data.

According to one embodiment, the terminal apparatus 100 may store data related to a messenger program (e.g. an icon corresponding to a command) in the storage 190.

According to one embodiment, the storage 190 may be configured to store touch information corresponding to a touch and/or consecutive touch motions (e.g. X and Y coordinates of a detected touch position, a touch detection time, etc.). The storage 190 may be configured to store the kind of consecutive touch motions (e.g. flicking, dragging, or dragging and dropping), and the controller 110 compares a user's input touch with the information stored in the storage 190, thereby determining the kind of touch. The storage 190 may be configured to further store a visual feedback (e.g., a video source, etc.) output to the display 140 and recognizable by a user in response to an input touch or touch gesture, an auditory feedback (e.g. a sound source, etc.) output from the loudspeaker 171 and recognizable by a user, and a tactile feedback (e.g. a haptic pattern, etc.) output from the vibration motor 172 and recognizable by a user.

According to one embodiment of the present invention, the terminal apparatus 100 is usable with the same user account as the hub device 200 and/or the server 400. That is, a user of the terminal apparatus 100 downloads and installs the messenger program, i.e. the application capable of transmitting a command to the devices 301, 302, 303 and 304 in the terminal apparatus 100, and logs on to the application with his/her own account.

According to another embodiment, the hub device 200 and/or the server 400 may be accessed by a plurality of terminal apparatuses 100 using different user accounts. For example, in a case of a family of four, some or the entire family of four can log on to the messenger program installed in their own terminal apparatuses 100 with regard to the hub device 200 installed in home, and issue a command to the device 301, 302, 303 or 304 through the hub device 200.

To this end, the hub device 200 may previously store usable information about at least one user account.

According to one embodiment of the present invention, the home network system 1 provides IoT environments of transmitting a control signal to at least one device 301, 302, 303 and 304 through the hub device 200 in response to a user's input using the terminal apparatus 100.

To this end, the terminal apparatus 100 according to one embodiment of the present invention is provided with at least one program for providing the messenger service, issues a command for controlling the operations of the device 301, 302, 303 and 304 (hereinafter, referred to as IoT devices or home devices) through the dialog box (corresponding to the second user interface, and also referred to as a chat channel, a chatting window, or a chatroom) displayed on the display 140 as the installed messenger program runs, and transmits a control signal to at least one device 301, 302, 303 and 304 through the hub device 200. Therefore, the terminal apparatus 100 is used for interaction with the IoT device.

Here, according to one embodiment, the hub device 200 may be added as a counterpart (hereinafter, referred to as a friend or a chat user) in the messenger program executed in the terminal apparatus 100. The display 140 of the terminal apparatus 100 displays the dialog box in which the hub device 200 is the counterpart, and a user may selectively input a command to the device 301, 302, 303 and 304 capable of communicating with the hub device 200 in the displayed dialog box.

According to another embodiment, the device 301, 302, 303 and 304 included in the home network system 1 may be added as counterparts to the messenger program running in the terminal apparatus 100. The display 140 of the terminal apparatus 100 displays the dialog box where a specific device (e.g. 301) is regarded as the counterpart, and a user may make selection to input a command to the corresponding device 301 in the displayed dialog box.

According to still another embodiment, the messenger program running in the terminal apparatus 100 may set a chatting group including two or more devices (e.g. 301 and 302) added as the counterparts by a user's selection. The display 140 of the terminal apparatus 100 displays a chatroom where interaction with the devices 301 and 302 included in the set group is possible, and a user may make an input to the chatroom so that the command can be simultaneously transmitted to two or more devices 301 and 302.

According to one embodiment, the hub device 200 or the devices 301, 302, 303 and 304 are identified with addresses assigned thereto in the home network system 1, and the identification information of each device 200, 301, 302, 303, 304 is registered as the counterpart in the messenger program. For example, the controller 110 of the terminal apparatus 100 may retrieve the IP address of the hub device 200 from the home network system 1 supporting Wi-Fi, and add the hub device 200 as the counterpart in accordance with retrieving results.

According to one embodiment, the dialog box may include an input area 610 (see FIG. 6) where a virtual keypad (or a virtual keyboard) for receiving a user's input is displayed, a message input window 620 for showing a user's current input content, and a message display area 630 for displaying a completely input message.

Here, the virtual keypad includes an IoT tab (or a standard tab) 611 (see FIG. 6) provided as a button selectable based on a touch input, and the IoT tab 611 is activated in response to a user's input for registering the hub device 200 or at least one device 301, 302, 303 and 304 targeted for control as the counterparts.

According to one embodiment, the keypad including the IoT tab 611 may be launched as built in the terminal apparatus 100 during the manufacturing stage. In this case, the terminal apparatus 100 launched by a specific manufacturer supports a keypad including the IoT tab 611 without any separate installation process.

Alternatively, a user may download and install a keypad program including the IoT tab 611 from the App store.

Below, embodiments of executing the messenger program and registering the counterpart to set a command for controlling at least one device 301, 302, 303 and 304 will be described.

Figure 3:
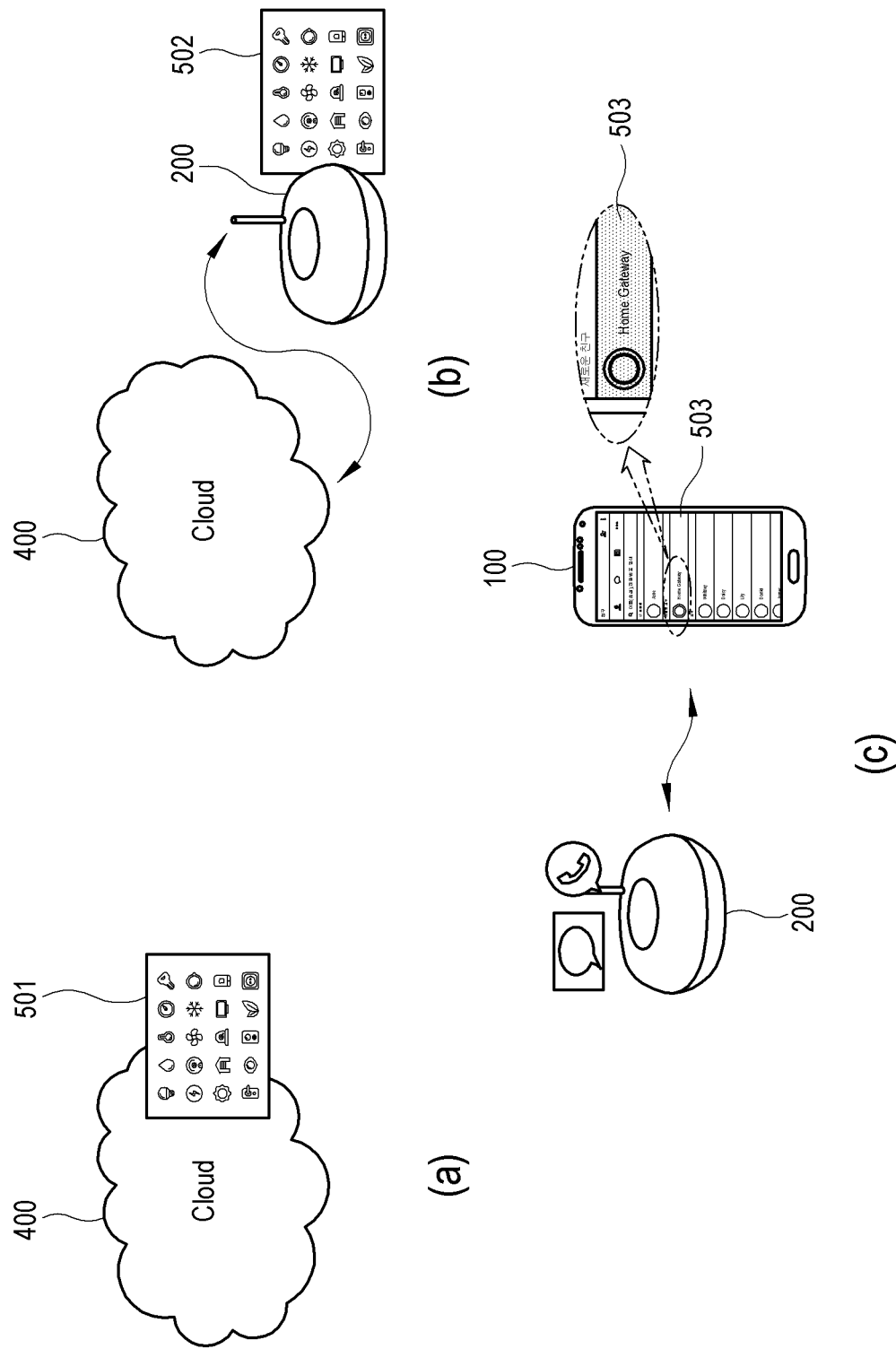
FIGS. 3, 4 and 5 are views for explaining a process of registering a counterpart in a terminal apparatus according to one embodiment of the present invention.
Figure 4:
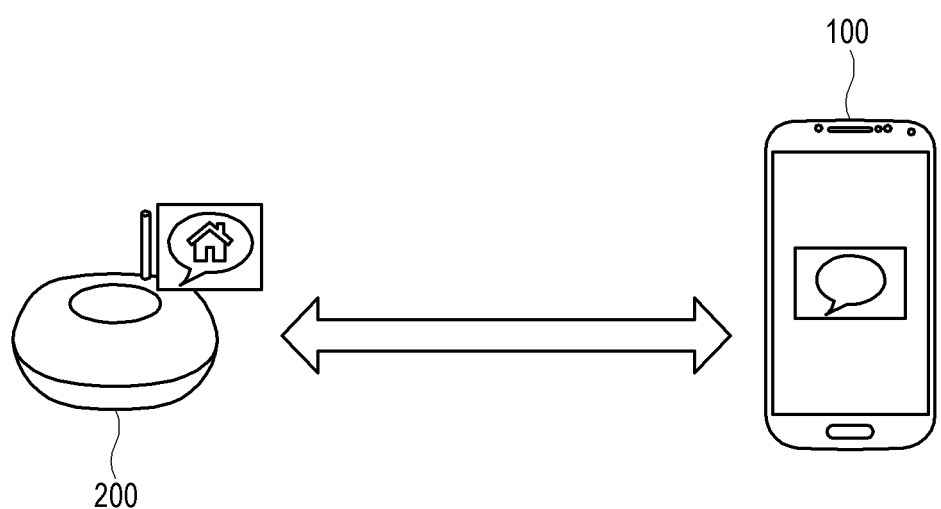
Figure 5:
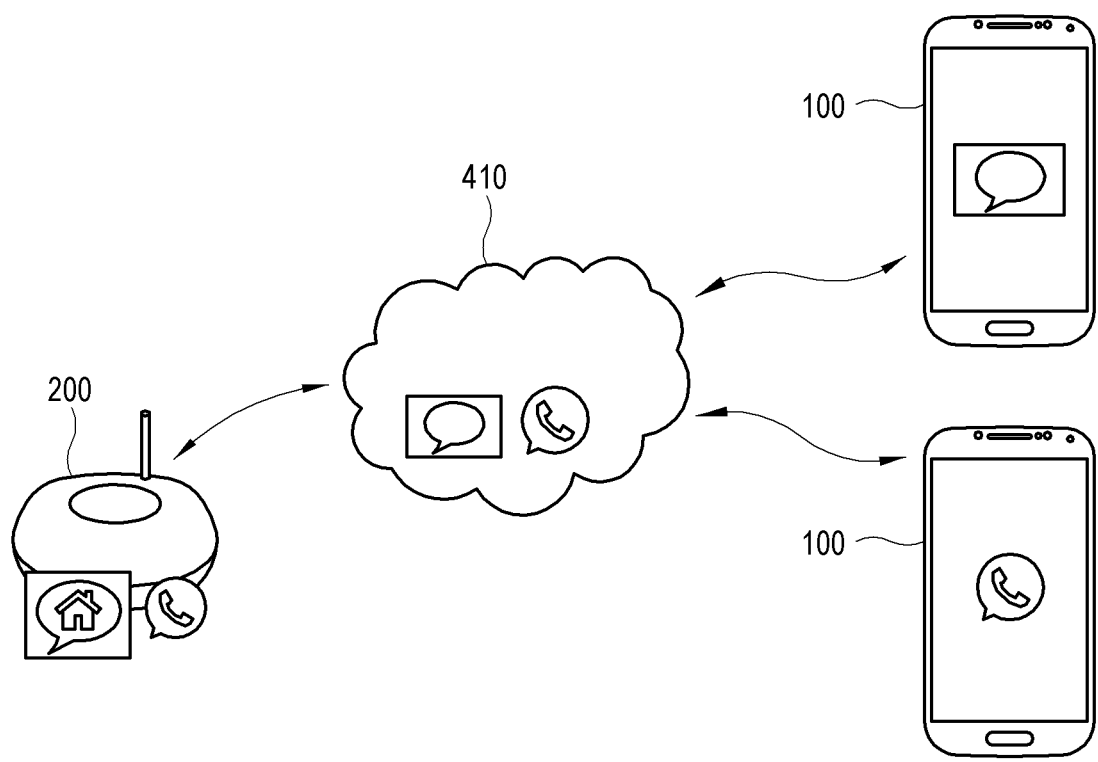

FIGS. 3 to 5 are views for explaining a process of registering a counterpart in the terminal apparatus 100 according to one embodiment of the present invention.

Referring to (a) of FIG. 3, the server 400 may be storing data 501 including a command for controlling the devices 301, 302, 303 and 304. (a) of FIG. 3 shows that a plurality of commands for controlling the devices 301, 302, 303 and 304 are defined as icons respectively corresponding to the commands.

As shown in (b) of FIG. 3, the hub device 200 may download and store data 502 about a command for controlling the devices 301, 302, 303 and 304 from the server 400. Thus, the command is synchronized between the server 400 and the hub device 200.

Further, a predetermined messenger program is executed in the terminal apparatus 100 in response to a user's input, and, the executed messenger program registers the hub device 200 as a counterpart 503 shown in (c) of FIG. 3. Here, a user may add the hub device 200 as the counterpart by searching a counterpart list (or a friend list) of the messenger program. According to one embodiment, the identification information of the terminal apparatus 100 or the device 301, 302, 303 and 304 may be used during the searching process.

According to another embodiment, the controller 110 of the terminal apparatus 100 may automatically register (or add) the hub device 200 or at least one device 301, 302, 303 and 304 as the counter parts in the running messenger program, or may control the display 140 to display the hub device 200 or at least one device 301, 302, 303 and 304 in a counterpart recommendation list.

A user may check that the hub device 200 is registered as the counterpart 503 in the friend list shown in (c) of FIG. 3, and selects the corresponding tab 503 by a touch input, thereby making the display 140 display the dialog box where the hub device 200 is registered as the counterpart.

Referring to FIG. 4, according to one embodiment, when the terminal apparatus 100 performs first-time registration for registering the hub device 200 as the counterpart, data about a command for controlling the devices 301, 302, 303 and 304 may be transmitted from the terminal apparatus 100 to the hub device 200. Thus, the command is synchronized between the terminal apparatus 100 and the hub device 200.

Here, the hub device 200 operates as an IoT hub in a home network, and the terminal apparatus 100 is set up to transmit various commands to the hub device 200 through the messenger program. In this process, a messenger service provider may authorize the hub device 200 to directly receive a command from the terminal apparatus 100 and control the devices 301, 302, 303 and 304.

Meanwhile, according to another embodiment, the terminal apparatus 100 may download data about the command for controlling the device 301, 302, 303 and 304 from the server 400 as shown in FIG. 5. In this case, remote control may be performed using a communication network 410 (e.g. a messaging infrastructure or a third party infrastructure) provided by the messenger service provider (e.g. a telecommunication company, a portal site, etc.) operating the server 400.

Referring to FIG. 5, according to still another embodiment, a plurality of messenger programs may be installed in the terminal apparatus 100. A user may register the hub device 200 as the counterpart by installing and executing each application in the terminal apparatus 100.

The terminal apparatus 100 may execute one among the plurality of messenger programs installed by a user's selection, and input a command through the dialog box of the executed program, thereby transmitting the command to the hub device 200 via the communication network 410 of the service provider or a mobile communication network of the telecommunication company.

FIGS. 2 to 5 illustrate examples that the hub device 200 is registered as the counterpart and set to transmit the command to the devices 301, 302, 303 and 304. However, it will be easily understood by a person having an ordinary skill in the art that the same manner is applicable even when the device 301, 302, 303 and 304 are individually registered as the counterparts.

Below, embodiments of inputting a command for controlling the device 301, 302, 303 and 304 through the dialog box will be described.

Figure 6:
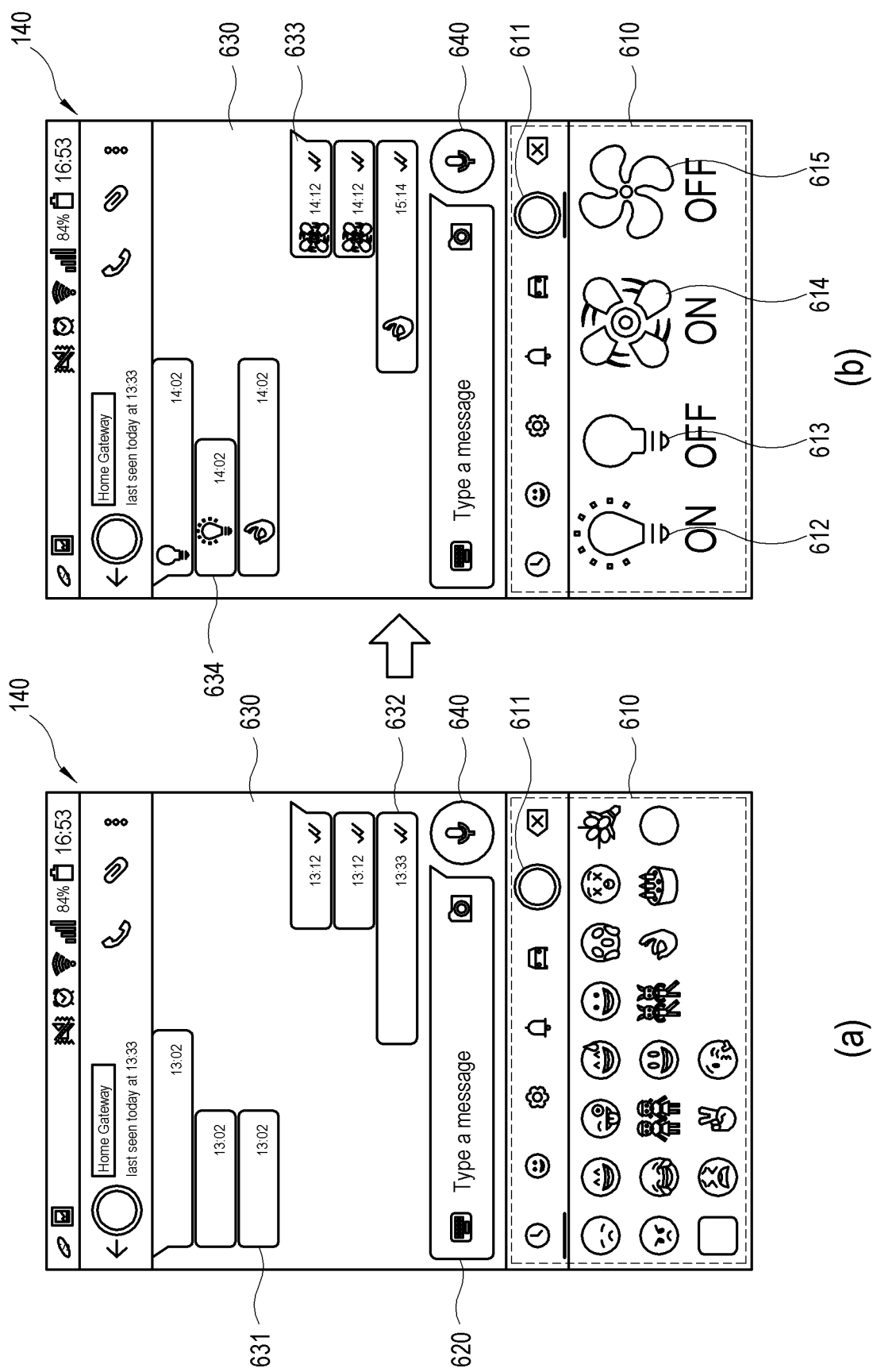

FIGS. 6 to 10 are views for explaining a process of inputting a command for controlling a device through a dialog box in the terminal apparatus 100 according to one embodiment of the present invention, When a user's selection is made with regard to the tab 503 of the hub device 200 in the counterpart list shown in (c) of FIG. 3, the controller 110 of the terminal apparatus 100 controls the display 140 to display a dialog box as shown in (a) of FIG. 6.

Referring to (a) of FIG. 6, the dialog box may include the input area 610 where a virtual keypad for receiving a user's input is displayed, the message input window 620 for showing a user's current input content, and the message display area 630 for displaying a completely input message.

The message display area 630 may display a message 631 that has been received from a counterpart, i.e. the hub device 200 previously (in the past), and/or a message 632 that is transmitted from the terminal apparatus 100 to the counterpart, i.e. the hub device 200, for example, in the form of a word babble.

The input area 610 displays various icons selectable by a user, and the icons may be classified according to the kinds. Further, a plurality of tabs for selecting the kinds of icon may be displayed above the icons.

According to one embodiment, the plurality of tabs includes an IoT tab 611. The IoT tab 611 may be activated in response to the counterpart registration (addition) described with reference to FIG. 3.

The terminal apparatus 100 is provided to receive a user's input of various types. For example, a user's input may include a voice spoken by a user, and the dialog box may further include a voice input icon 640 selectable by a user in a certain area to activate the voice input function.

The controller 110 may control the display 140 to display a plurality of icons 612, 613, 614 and 615 for controlling the devices 301, 302, 303 and 304 on the input area 610 of the dialog box as shown in (b) of FIG. 6, in response to a user's input of selecting the IoT tab 611 in the dialog box as shown in (a) of FIG. 6.

A user may make a touch input for selecting one among the icons displayed in the dialog box shown in (b) of FIG. 6, and the controller 110 controls the communicator 120 to transmit a command corresponding to the selected icon to the hub device 200. For example, when an icon 614 for turning on a ventilator is selected to clean air, a control signal including a command for operating the ventilator is transmitted to the hub device 200 via the communicator 120, and the control signal is transmitted to the corresponding device, i.e. the ventilator through the hub device 200.

The ventilator operates based on the received control signal.

The controller 110 may control the display 140 to display a message 633 corresponding to the transmitted command on the message display area 630. With the transmitted message 633 shown in (b) of FIG. 6, a user can check that the icon 614 for operating the ventilator is selected and the corresponding command is normally transmitted at 14:12.

The message display area 630 further displays a message 634 corresponding to device state information received from the devices 301, 302, 303 and 304 through the hub device 200. A user can check the current states of the devices 301, 302, 303 and 304 based on the state information message 634

According to one embodiment, when the command transmission fails, the message display area 630 may display a message for notifying a user of the failure. A user may determine whether or not to retransmit the corresponding command on the basis of the displayed message.

The user's input received in the dialog box displayed on the terminal apparatus 100 according to the present invention is not limited to the icon described with reference to FIG. 6, but may include a test, a drawing, a voice input, etc.

Figure 7:
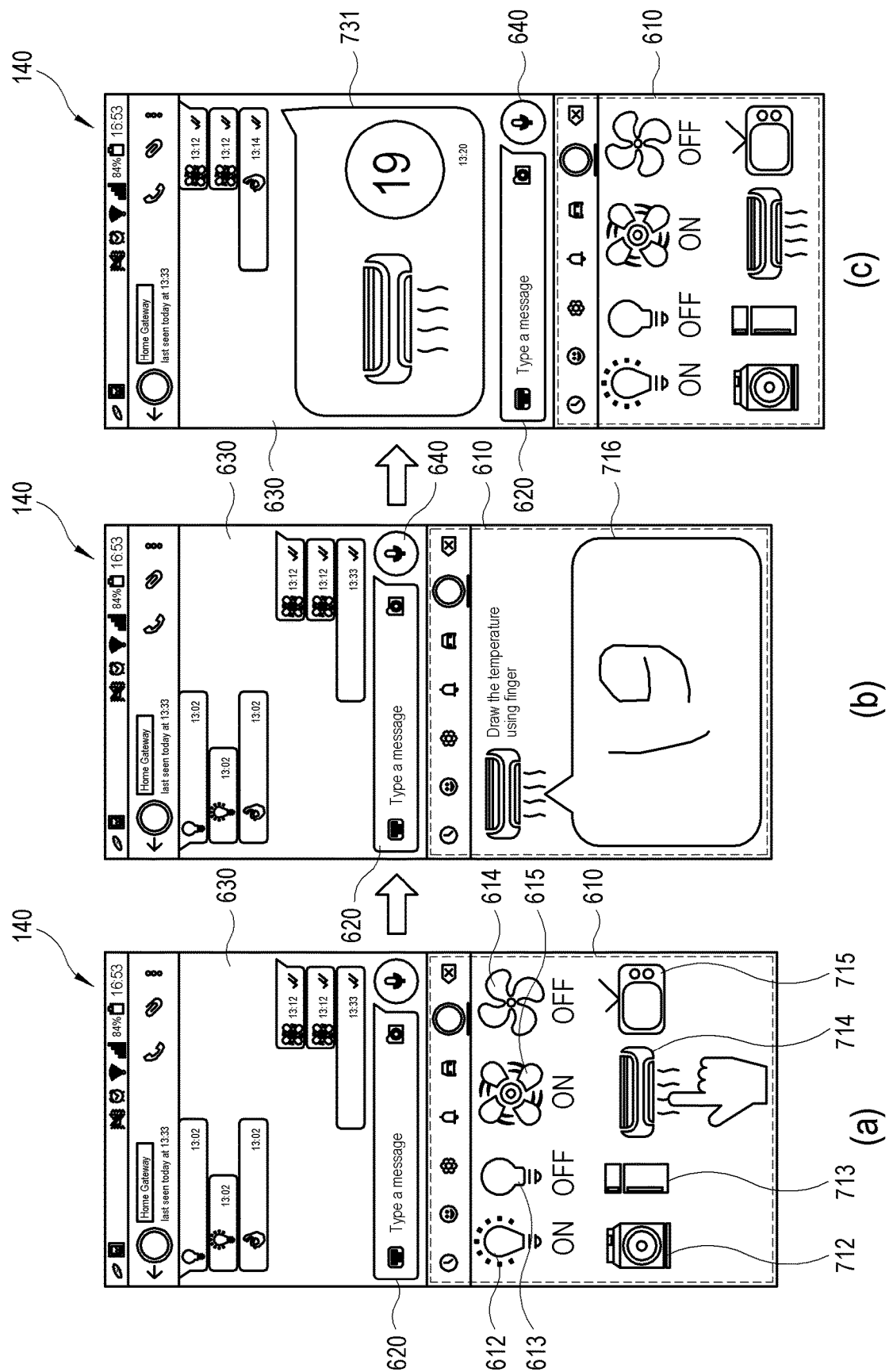

Referring to FIG. 7, the plurality of icons displayed on the input area 610 of the dialog box may correspond to the plurality of devices 301, 302, 303, and 304, respectively. In other words, icons 712, 713, 714, and 715 respectively corresponding to a washing machine, a refrigerator, an air conditioner, and a TV operating as the IoT devices are displayed to be selectable by a user.

For example, when a touch input for selecting an air conditioner icon 714 is received as a first input of a user as shown in (a) of FIG. 8, the terminal apparatus 100 may further receive a second input of a user as a detailed command for a device 303 (see FIG. 1) corresponding to the icon 714 selected in the input area 610 of the dialog box.

In FIG. 8, (b) shows an example that a drawing input is received as the second input of a user. In this embodiment, the drawing input is defined as included in a gesture input received as a touch input to the touch screen 141, and a drawing object corresponding to a moving path of a gesture input may be displayed within a drawing area 716 of the input area 610.

When the touch screen controller 145 senses a drawing input of a user, the controller 110 may determine the second input of a user based on a pattern of the drawing object corresponding to the received input. For example, as shown in (b) of FIG. 8, when a drawing input is made having a numeral pattern of '19', the controller 110 determines this drawing input as a numeral of '19' and controls the communicator 120 to transmit a commend for controlling an air conditioner to be kept at a set temperature of 19 degrees to the hub device 200.

Further, the controller 110 controls the display 140 to display a message 731 corresponding to the transmitted command on the message display area 630. Therefore, a user can check the input and transmitted command through the updated message display area 630.

FIG. 7 illustrates an example that the drawing input is made as the second input of a user on the drawing area 716. However, the terminal apparatus 100 according to one embodiment of the present invention may further receive various kinds of user's inputs.

Alternatively, when a user selects the message input window 620 in (b) of FIG. 7, the input area 610 may display a keypad (or a keyboard) in which a test, i.e., a letter, a numeral, a character, etc. are selectable as the second input of a user. A user may for example select a numeral of '1' and a numeral of '9' in sequence, and thus the controller 110 controls the communicator 120 to transmit the command for controlling the air conditioner to be kept at a set temperature of 19 degrees to the hub device 200.

Alternatively, when a user selects the voice input icon 640 in (b) of FIG. 7, the controller 110 activates the microphone 152 to sense a voice spoken by a user. When a user for example utters sounds of '19', the controller 110 recognizes the sounds as the numeral of '19' and controls the communicator 120 to transmit the command for controlling the air conditioner to be kept at a set temperature of 19 degrees to the hub device 200.

Here, the command given in the form of a text, a voice, or the like includes a natural language. The controller 110 may use various natural language processing (NLP) algorithms to analyze a command corresponding to a user's input.

Meanwhile, FIGS. 6 and 7 illustrate the embodiments of selecting the icon to issue the command, but the present invention may include an embodiment of transmitting a command to a predetermined device without selecting an icon. For example, when a user inputs a text of 'TURN AIR 25' to the message input window 620 of the dialog box, the controller 110 parses the text into unit words of 'TURN', 'AIR', and '25', maps the words to those in a previously stored table, and controls the communicator 120 to transmit a command for turning on the air conditioner and keeping the setting temperature at 25 degrees.

Therefore, according to one embodiment of the present invention, it will be easily understood by a person having an ordinary skill in the art that various user inputs such as an icon, a test, a drawing, a voice, etc. sensible in the terminal apparatus 100 can be made as the first input and/or second input of a user.

According to one embodiment, the terminal apparatus 100 sets a group including a plurality of devices, and transmit a command to all or some of the plurality of devices included in the group. Here, a user input for setting the group is defined as a third input of a user.

According to one embodiment, the group may be classified into regions in a house, for example, a garage, a living room, a front entry, a media room, a kitchen, etc., but not limited thereto. For example, lights installed in the living room, the front entry, the kitchen, and one or more bedrooms may be set as one group according to the present invention. Information about such as set group is transmitted to the hub device 200 and/or the server 400, and shared, i.e. synchronized.

According to another embodiment, the group information may be received from the server 400. In other words, the hub device 200 receives the group information from the server 400, and the received information is transmitted to the terminal apparatus 100 via the hub device 200. Thus, the information is shared, i.e. synchronized among the server 400, the hub device 200, and the terminal apparatus 100.

Below, the case where the groups are set according to regions in a house will be described by way of example. However, it will be easily understood by a person having an ordinary skill in the art that the groups may be variously set.

Referring to (a) of FIG. 8, a grouping icon 810 may be included in the input area 610 of the dialog box displayed in the terminal apparatus 100 according to one embodiment. A user may select the grouping icon 810, and set a predetermined group by selecting two or more devices included in the group among the devices capable of communicating with the hub device 200.

For example, the input area 610 of the dialog box may display a group addition icon 813 as shown in (b) of FIG. 8 in response to selection of the grouping icon 810, and a user may make an input about group setting by selecting the group addition icon 813. When devices are completely selected to be included in a group, the terminal apparatus 100 may further receive an input about a group name (e.g. a garage, etc.) including the devices selected by a user.

(b) of FIG. 8 shows a case that icons 811 and 812 corresponding to completely set groups are displayed on the input area 610.

According to one embodiment, the terminal apparatus 100 may use the set group and selectively issue the command to one or at least two devices included in the corresponding group.

Figure 9:
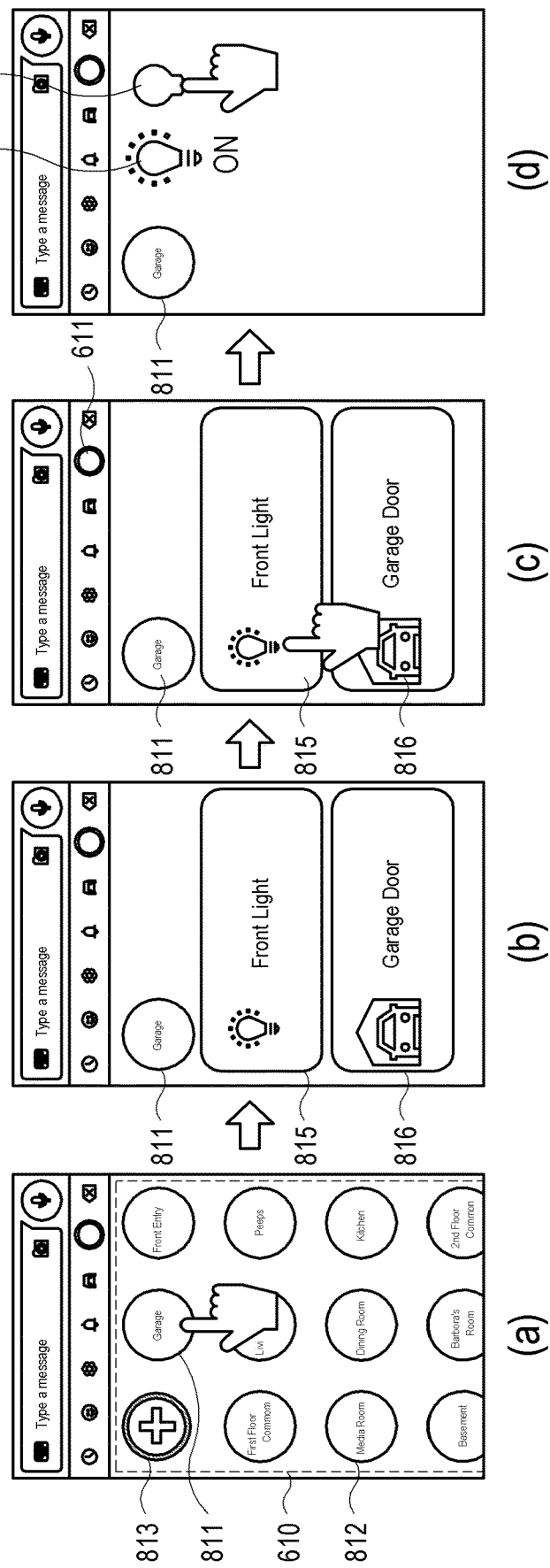

Specifically, the terminal apparatus 100 may receive a user's input for selecting a group including devices, to which the command will be transmitted, for example, a garage icon 811 as shown in (a) of FIG. 9, among the icons 811 and 812 corresponding to the set groups displayed in response to a user's selection of the grouping icon 810 shown in (a) of FIG. 8.

In response to the selection of the garage icon 811, the controller 110 may control the input area 610 to display icons 815 and 816 corresponding to the devices included in the corresponding group, for example, a front light installed in the entry of the garage, a garage door, or the like as shown in (b) of FIG. 9.

When a user makes a touch input for selecting the front light icon 815 as shown in (c) of FIG. 9, the controller 110 may sense the touch input and control the display 140 to further display icons 817 and 818 for selecting a detailed command with regard to the corresponding device, i.e. the front light in the input area 610 of the dialog box as shown in (d) of FIG. 9. In the case of (d) of FIG. 9, for example, a user may select a power off icon 818, and thus a command for turning off the front light of the garage may be transmitted from the terminal apparatus 100 to a controller for the corresponding device, i.e. the front light of the garage via the hub device 200.

Here, the terminal apparatus 100 according to one embodiment of the present invention may be configured to simultaneously transmit the command to two or more devices included in a predetermined group.

Figure 10:
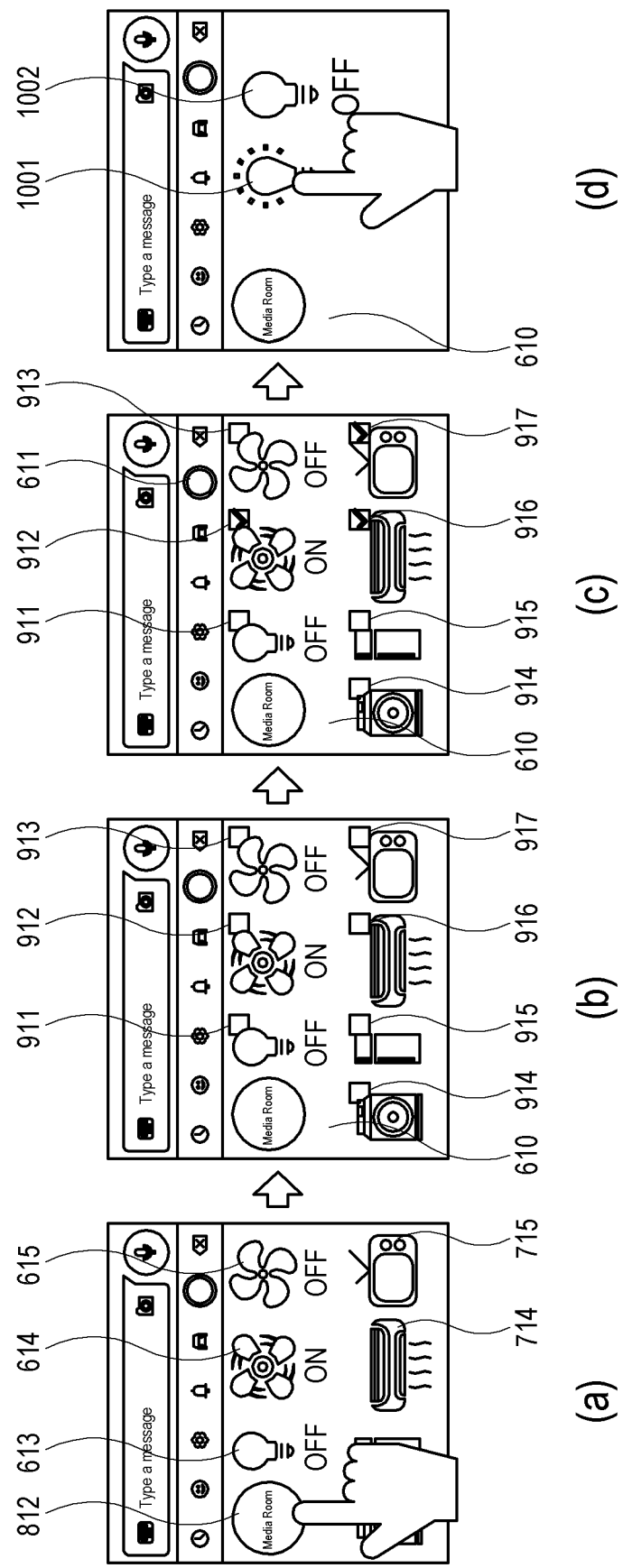

Specifically, the terminal apparatus 100 may receive a user's input for selecting a group including to devices to which the command is issued by the user, for example, a media room icon 812 as shown in (a) of FIG. 10.

In FIG. 10, (a) shows an embodiment where the icons 613, 614 and 615 corresponding to the command for controlling a predetermined device, the icons 714 and 715 corresponding to the devices targeted for control (i.e. the IoT devices), and the icon 812 corresponding to a preset group are displayed in the input area 610 of the dialog box in response to selection of the IoT tab 611 shown in (a) of FIG. 6, by way of example.

According to another embodiment, icons corresponding to the command frequently used by a user, the devices (e.g. the IoT devices), the group, etc. may be displayed in the form of Favorites or Shortcut on the input area 610 in response to the selection of the IoT tab 611.

After the selection of the media room icon 812 shown in (a) of FIG. 10, the terminal apparatus 100 may further receive a user's input for selecting the devices included in the media room. For example, as shown in (b) of FIG. 10, check boxes 911, 912, 913, 914, 915, 916, and 917 for selecting the icons corresponding to the devices may be activated in the input area 610, and thus a user may make an input for selecting the check boxes 912, 916, and 917 about the icons corresponding to the ventilator, the air conditioner and the television as shown in (c) of FIG. 10.

Further, the controller 110 may control the display 140 to display the icons 1001 and 1002 corresponding to the command for the operations of the selected devices on the input area 610 as shown in (d) of FIG. 10. For example, as shown in (d) of FIG. 10, a user selects the command 1001 for turning on the operation, and the controller 110 of the terminal apparatus 100 controls the communicator 120 to transmit the command for immediately operating the ventilator, the air conditioner, and the television located within the media room to the controllers of the devices through the hub device 200 in response to a user's selection. Here, a user may use the terminal apparatus 100 to further make an input of an additional command, such as an input of a setting temperature for controlling the air conditioner, selection of a channel number, a volume control, etc. of a TV, etc. by the method described in FIG. 7 or another method.

Meanwhile, a user may use the terminal apparatus 100 at the outside to transmit the command to the devices 301, 302, 303 and 304 located in home.

Figure 11:
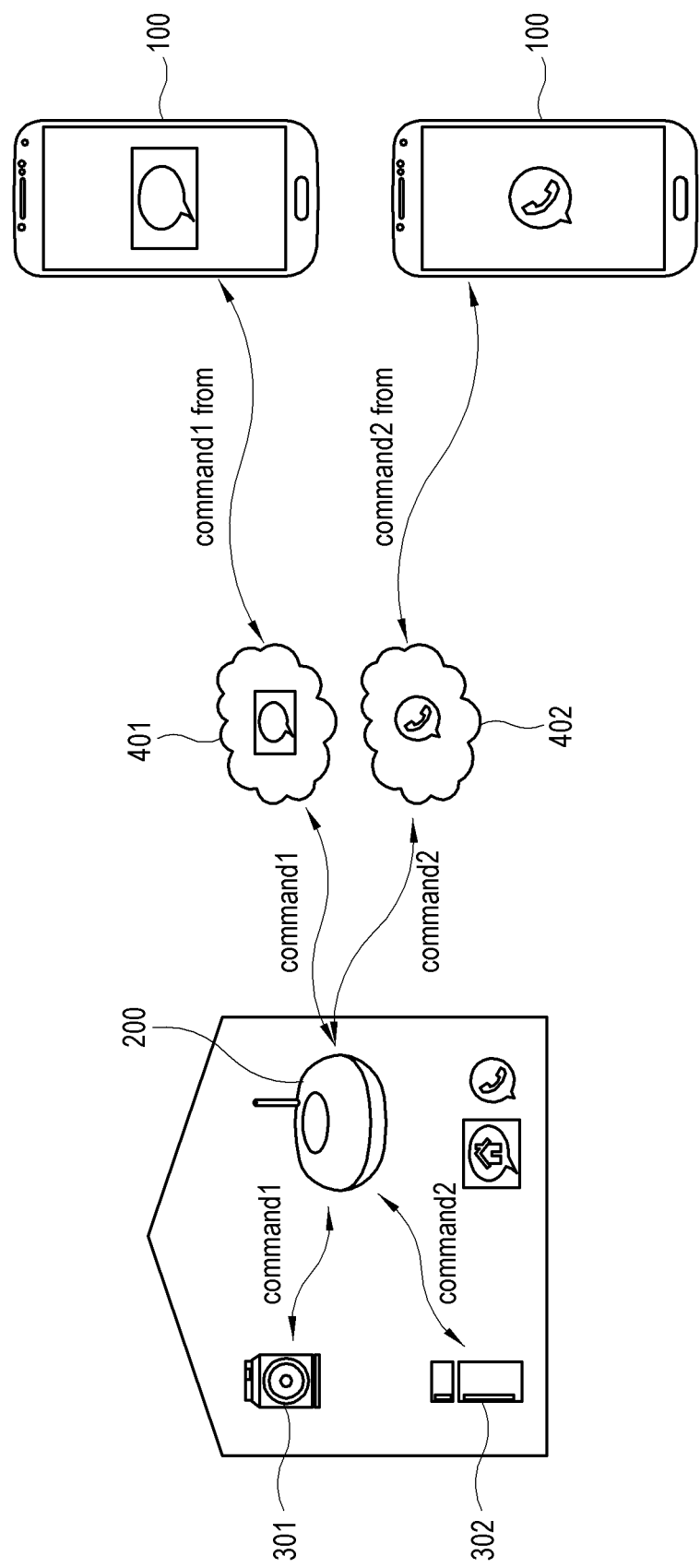
FIG. 11 illustrates an example of transmitting a command by a terminal apparatus at an outside according to one embodiment of the present invention.

FIG. 11 illustrates an example of transmitting a command by the terminal apparatus 100 at the outside according to one embodiment of the present invention.

As shown in FIG. 11, a user may execute a messenger program (e.g. an application #1), in which the hub device 200 or at least one device 301 and 302 are registered as the counterparts, in the terminal apparatus 100 at the outside, and input a command #1 for controlling an operation of a predetermined device, e.g. a washing machine 301 to the dialog box of the corresponding program, i.e. the application #1. The input command #1 is transmitted to the hub device 200 in the home through a communication network 401 of the corresponding application #1. Further, the command #1 is transmitted from the hub device 200 to the corresponding device, i.e. the washing machine 301, and thus the washing machine 301 is controlled to perform the operation corresponding to the command #1.

Referring to FIG. 11, a user may use another messenger program (e.g. an application #2), in which the hub device 200 or at least one device 301 and 302 are registered as the counterparts, in the terminal apparatus 100 at the outside, thereby transmitting the command. Specifically, a user may input a command #2 for controlling an operation of a predetermined device, e.g. a refrigerator 302 in the dialog box of the program, i.e. the application #2 executed in the terminal apparatus 100. The input command #2 is transmitted to the hub device 200 in home through the communication network 402 of the corresponding application #2. Further, the command #2 is transmitted from the hub device 200 to the corresponding device, i.e. the refrigerator 302, and the refrigerator 302 is thus controlled to perform an operation corresponding to the command #2 in response to the command #2.

Below, a method of controlling the terminal apparatus 100 according to one embodiment of the present invention to transmit the command to the devices 301, 302, 303 and 304 operating as the IoT devices will be described with reference to the accompanying drawings.

Figure 12:
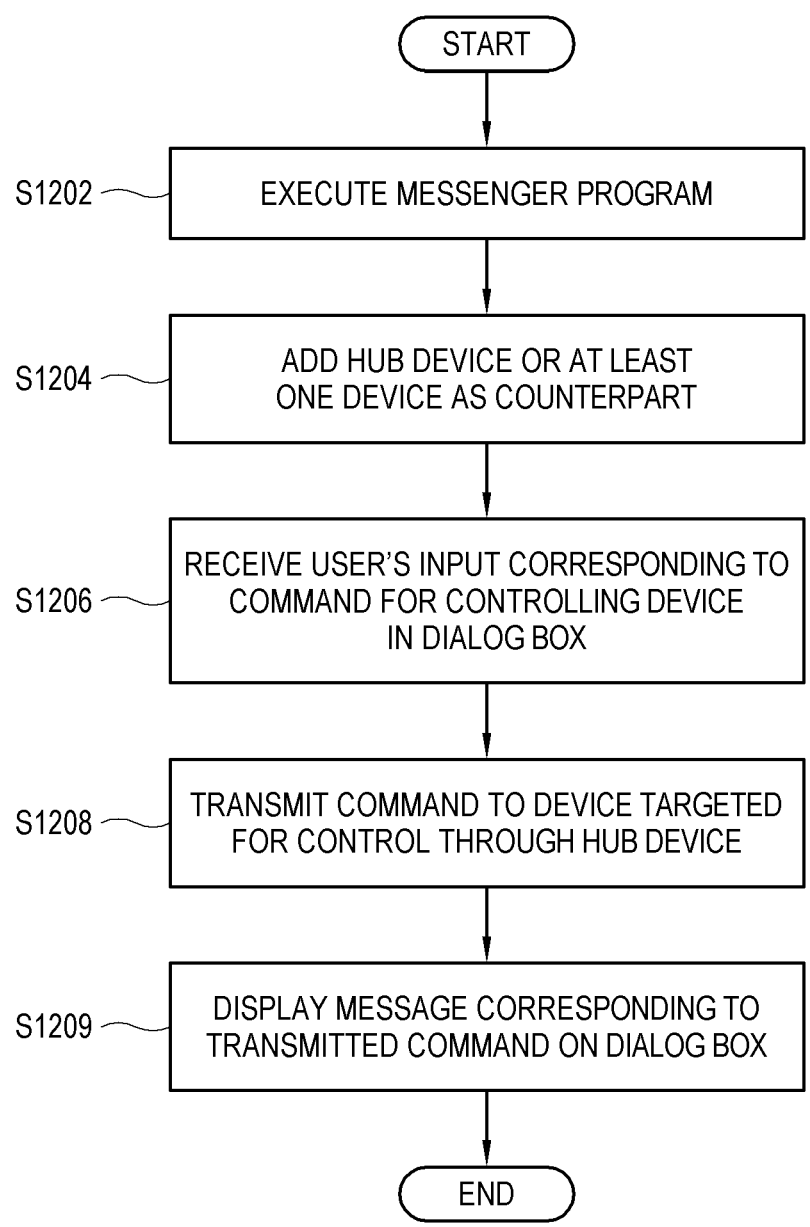
FIG. 12 is a flowchart of a controlling method of a terminal apparatus according to one embodiment of the present invention.

FIG. 12 is a flowchart of a controlling method of the terminal apparatus 100 according to one embodiment of the present invention.

As shown in FIG. 12, the terminal apparatus 100 may receive a user's input for executing the messenger program through the user input receiver 150 (S1202). Here, the messenger program, which is provided to support communication between users through different terminal apparatuses, may be downloaded by a user from the App store or may be provided as a built-in program as necessary when the terminal apparatus 100 is launched.

The terminal apparatus 100 may receive a user's input, which is made to add the hub device 200 or at least one device 301, 302, 303 and 304 as the counterparts in the messenger program executed in the operation S1202, through the user input receiver 150 (S1204).

The terminal apparatus 100 receives a user's input corresponding to the command for controlling a predetermined device in the dialog box with the counterpart, e.g. the hub device 200 added in the operation S1204 (S1206). Here, a user may make an input to transmit the command to one or at least two devices, or make selection to transmit the command to one or at least two devices included in a predetermined group.

In the operation S1206, the terminal apparatus 100 may receive a user's input in various ways of an icon selected corresponding to the command, a text, a drawing, or a voice uttered by a user. A user's input received in the form of the text, the voice, etc. includes a natural language. Further, the terminal apparatus 100 may receive a command for controlling the device by combination of two or more user inputs as described above. For example, when the counterpart is the hub device 200, a user selects an icon corresponding to a specific device, and input a drawing or a text as the command for controlling the selected device.

The controller 110 of the terminal apparatus 100 controls the communicator 120 to transmit a control signal including the command received in the operation S1206 to the device targeted for control through the hub device 200 (S1208). In other words, the control signal including the command is transmitted from the terminal apparatus 100 to the hub device 200, and the hub device 200 identifies the device targeted for control with respect to the command and transmits the control signal to at least one device corresponding to the command.

Further, the controller 110 controls the display 140 to display a message corresponding to the transmitted command on the dialog box (S1210).

Features according to many embodiments of the present invention may be partially or entirely united or combined to each other and technically variously interlocked and driven as fully understood by a person having an ordinary skill in the art, and the embodiments may be realized independently of or together with each other.

Meanwhile, the foregoing exemplary embodiments of the present invention may be realized by a computer readable recording medium. The computer readable recording medium includes a storage medium for storing data readable by a transmission medium and a computer system. The transmission medium may be achieved by a wired/wireless network through which computer systems are linked to one another.

The foregoing exemplary embodiments may be realized by hardware and combination between hardware and software. As the hardware, the processor 111 may include a nonvolatile memory in which a computer program is stored as the software, a RAM in which the computer program stored in the nonvolatile memory is loaded, and a CPU for executing the computer program loaded in the RAM. The nonvolatile memory may include a hard disk drive, a flash memory, a ROM, CD-ROMs, magnetic tapes, a floppy disc, an optical storage, a data transmission device using the Internet, etc., but is not limited thereto. The nonvolatile memory is a kind of computer-readable recording medium in which a program readable by a computer of the present invention is recorded.

The computer program is a code that is read and executed by the CPU, and includes codes for performing the operations of the controller 110 such as the operations S1202 to S1210 as shown in FIG. 12.

The computer program may be included in an operating system provided in the terminal apparatus 100 or software including an application and/or software interfacing with an external apparatus.

Although the present invention has been shown and described through exemplary embodiments, the present invention is not limited to the exemplary embodiments and may be variously materialized within the appended claims.

REFERENCE NUMERALS

| | |
|---|---|
| 1: home network system | 100: terminal apparatus |
| 110: controller | 120: communicator |

-continued

| | |
|---|---|
| 130: video processor | 140: display |
| 150: user input receiver | 160: sensor |
| 171: loudspeaker | 180: image capturer |
| 190: storage | 195: power supply |
| 301, 302, 303, 304: device | 400: server |

What is claimed is:

1. A terminal apparatus comprising:
a communicator, comprising a communication circuit, configured to communicate with a hub device and at least one device through the hub device;
a display configured to display an image;
an input receiver configured to receive input and comprising at least one of a button, a microphone, a keypad, or an input device; and
at least one processor configured to:
based on a messenger program being executed in the terminal apparatus according to an input through the input receiver, control the display to display a first user interface (UI) comprising a first item of a chat user in a first area of the display, a message input window in a second area of the display, and a message displaying window in a third area of the display,
based on the first item being selected at the first area and a message being input into the message input window of the second area in the displayed first UI through the input receiver, control the communicator to transmit the input message to a first device of the chat user and control the display to display the transmitted message in the message displaying window of the third area of the display,
based on a first tab of the displayed first UI being selected through the input receiver, control the display to display a second UI comprising a second item corresponding to a first command for controlling a second device in the first area, while maintaining the message input window in the second area and the message displaying window in the third area, by replacing the first item with the second item in the first area of the display, and
based on the second item being selected in the displayed second UI through the user input receiver, control the communicator to transmit a first control signal including the first command to the hub device, which identifies the second device corresponding to the first command and transmits the first control signal thereto, or to transmit the first control signal to the second device through the hub device, and control the display to display a message corresponding to the first command in the message displaying window of the third area of the display,
wherein the at least one processor is further configured to:
based on the second item being selected in the displayed second UI, control the display to display a drawing area capable of receiving a drawing input for the first command in the first area of the display,
based on the message input window being selected in the displayed second UI, control the display to display the keypad capable of selecting a text for the first command in the first area of the display, and
based on a voice input icon being selected in the displayed second UI, activate the microphone to sense a voice input for the first command.

2. The terminal apparatus according to claim 1, wherein the at least one processor is further configured to:
control the display to display a plurality of selectable icons corresponding to commands for controlling the one or more devices, and
the first command corresponds to an icon selected in response to an input through the input receiver.

3. The terminal apparatus according to claim 2, wherein the plurality of selectable icons is displayed in response to selection of the first tab, and the first tab is included in the keypad.

4. The terminal apparatus according to claim 3, wherein the first tab is activated in response to an input for registering the hub device or the at least one device.

5. The terminal apparatus according to claim 4, wherein the processor is configured to automatically register the hub device or the at least one device in the messenger program or control the display to display information about the hub device or the at least one device in a recommendation list.

6. The terminal apparatus according to claim 2, wherein at least one icon among the plurality of selectable icons corresponds to a device targeted for control, and
the processor is configured to receive, via the input receiver, a first input for selecting one among the plurality of selectable icons, and a second input corresponding to a command for controlling a device corresponding to the selected icon.

7. The terminal apparatus according to claim 2, wherein the processor is configured to:
receive, via the input receiver, an input for generating a group comprising a plurality of devices of the at least one device, and
control the communicator to transmit a second control signal comprising a second command to the plurality of devices through the hub device so that the plurality of devices included in the group is controlled based on the second command.

8. The terminal apparatus according to claim 2, wherein the first control signal comprising the first command is transmitted to the hub device via a communication network or mobile communication network of a service provider of the messenger program.

9. A method of controlling a terminal apparatus, the method comprising:
based on a messenger program being executed in the terminal apparatus according to an input to the terminal apparatus, displaying a first user interface (UI) comprising a first item of a chat user in a first area of a display of the terminal apparatus, a message input window in a second area of the display, and a message displaying window in a third area of the display;
based on a first item being selected at the first area and a message being input into the message input window of the second area in the displayed first UI, transmitting the input message to a first device of the chat user and displaying the transmitted message in the message displaying window of the third area of the display;
based on a first tab of the displayed first UI being selected, displaying a second UI comprising a second item corresponding to a first command for controlling a second device in the first area, while maintaining the message input window in the second area and the message displaying window in the third area, by replacing the first item with the second item in the first area of the display; and
based on the second item being selected in the displayed second UI, transmitting a first control signal including the first command to a hub device, which identifies the second device corresponding to the first command and transmits the first control signal thereto, or transmitting the first control signal to the second device through the hub device, and displaying a message corresponding to the first command in the message displaying window of the third area of the display, wherein the displaying the second UI further comprises:
based on the second item being selected in the displayed second UI, displaying a drawing area capable of receiving a drawing input for the first command in the first area of the display,
based on the message input window being selected in the displayed second UI, displaying a keypad capable of selecting a text for the first command in the first area of the display, and
based on a voice input icon being selected in the displayed second UI, activating a microphone to sense a voice input for the first command.

10. The method according to claim 9, further comprising:
displaying a plurality of selectable icons corresponding to commands for controlling the at least one device, wherein
the first command corresponds to an icon selected in response to an input to the terminal apparatus.

11. The method according to claim 10, further comprising displaying the plurality of selectable icons in response to selection of the first tab.

12. The method according to claim 11, further comprising activating the first tab in response to an input for registering the hub device or the at least one device.

13. The method according to claim 12, further comprising automatically registering the hub device or the at least one device in the messenger program, or displaying information about the hub device or the at least one device in a recommendation list.

14. The method according to claim 10, wherein at least one among the plurality of selectable icons corresponds to a device targeted for control, and the method further comprises:
receiving a first input for selecting at least one among the plurality of selectable icons; and
receiving a second input corresponding to a command for controlling a device corresponding to the selected icon.

15. The method according to claim 10, further comprising:
receiving an input for generating a group comprising a plurality of devices of the at least one device, and
transmitting a second control signal comprising a second command to the plurality of devices through the hub device so that the plurality of devices included in the group is controlled based on the second command.

16. A non-transitory computer-readable medium storing a program which, when executed by a processor of an electronic device, causes the electronic device to at least:
based on the program being executed in the electronic device according to an input to the electronic device, control a display of the electronic device to display a first user interface (UI) comprising a first item of a chat user in a first area of the display, a message input window in a second area of the display, and a message displaying window in a third area of the display,
based on the first item being selected at the first area and a message being input into the message input window of the second area in the displayed first UI through an input receiver of the electronic device, control a communicator of the electronic device, comprising a communication circuit, to transmit the input message to a first device of the chat user and control the display to display the transmitted message in the message displaying window of the third area of the display,
based on a first tab of the displayed first UI being selected through the input receiver, control the display to display a second UI comprising a second item corresponding to a first command for controlling a second device in the first area, while maintaining the message input window in the second area and the message displaying window in the third area, by replacing the first item with the second item in the first area of the display, and
based on the second item being selected in the displayed second UI through the input receiver, control the communicator to transmit a first control signal including the first command to a hub device, which identifies the second device corresponding to the first command and transmits the first control signal thereto, or to transmit the first control signal to the second device through the hub device, and control the display to display a message corresponding to the first command in the message displaying window of the third area of the display,
wherein the program is configured to, when executed by the processor, further cause the electronic device to at least:
based on the second item being selected in the displayed second UI, control the display to display a drawing area capable of receiving a drawing input for the first command in the first area of the display,
based on the message input window being selected in the displayed second UI, control the display to display a keypad of the user input receiver capable of selecting a text for the first command in the first area of the display, and
based on a voice input icon being selected in the displayed second UI, activate a microphone of the user input receiver to sense a voice input for the first command.

17. A system comprising the non-transitory computer-readable medium storing a program according to claim 16 and a processor configured to execute the program stored on the non-transitory computer-readable medium.

* * * * *